(12) United States Patent
Omichi et al.

(10) Patent No.: US 7,889,332 B2
(45) Date of Patent: Feb. 15, 2011

(54) PHYSICAL QUANTITY MEASURING APPARATUS UTILIZING OPTICAL FREQUENCY DOMAIN REFLECTOMETRY, AND METHOD FOR SIMULTANEOUS MEASUREMENT OF TEMPERATURE AND STRAIN USING THE APPARATUS

(75) Inventors: Koji Omichi, Sakura (JP); Akira Sakamoto, Sakura (JP); Shunichirou Hirafune, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/705,361

(22) Filed: Feb. 12, 2010

(65) Prior Publication Data

US 2010/0141930 A1    Jun. 10, 2010

Related U.S. Application Data

(63) Continuation of application No. PCT/JP2009/053899, filed on Mar. 2, 2009.

(30) Foreign Application Priority Data

Feb. 29, 2008 (JP) .............................. 2008-051343
Sep. 18, 2008 (JP) .............................. 2008-239368

(51) Int. Cl.
G01N 21/00 (2006.01)
G01L 1/24 (2006.01)
G02B 6/00 (2006.01)

(52) U.S. Cl. ........................ 356/73.1; 356/33; 356/35.5; 356/364; 356/368; 385/12; 385/15; 385/37; 385/31; 250/227.14; 250/227.17; 250/225

(58) Field of Classification Search ................ 356/73.1, 356/33, 33.5, 477, 478, 364, 368–370; 385/10, 385/11, 12, 13, 15, 37; 250/225, 227.14, 250/227.17

See application file for complete search history.

(56) References Cited

U.S. PATENT DOCUMENTS 6,417,507 B1 * 7/2002 Malvern et al. ........ 250/227.14

(Continued)

FOREIGN PATENT DOCUMENTS

JP    11-064119 A    3/1999

(Continued)

OTHER PUBLICATIONS

H. Murayama, et al, "Distributed Strain Measurement with High Spatial Resolution Using Fiber Bragg Gratings and Optical Frequency Domain Reflectometry", Proceedings OFS-18, ThE40, 2006.

(Continued)

*Primary Examiner*—L. G Lauchman
(74) *Attorney, Agent, or Firm*—Sughrue Mion, PLLC

(57) ABSTRACT

A physical quantity measuring apparatus utilizing optical frequency domain reflectometry of the invention includes a tunable laser; a first polarization-maintaining fiber; a polarization-maintaining coupler; a second polarization-maintaining fiber; a third polarization-maintaining fiber; a sensor consists of fiber Bragg gratings formed at a core of the third polarization-maintaining fiber; a fourth polarization-maintaining fiber; a photodiode detects Bragg reflected light from the sensor and reference light from the referential reflecting end; a controller detects a modulation of an interference intensity between the Bragg reflected light and the reference light, based on an intensity change of multiplexed light of the Bragg reflected light and the reference light; an incidence part inputs the measuring light; and an optical path-length adjuster arranged on the third polarization-maintaining fiber; the incidence part provided on the first polarization-maintaining fiber, or on both the second and third polarization-maintaining fibers.

20 Claims, 9 Drawing Sheets

U.S. PATENT DOCUMENTS

| | | | |
|---|---|---|---|
| 6,566,648 B1* | 5/2003 | Froggatt | 250/227.14 |
| 6,795,599 B2* | 9/2004 | Spirin et al. | 385/12 |
| 2010/0134783 A1* | 6/2010 | Omichi et al. | 356/33 |

FOREIGN PATENT DOCUMENTS

| | | |
|---|---|---|
| JP | 3819119 B2 | 3/1999 |
| JP | 2004-205368 A | 7/2004 |
| JP | 3740500 B2 | 7/2004 |
| JP | 2005-147900 A | 6/2005 |
| JP | 4102291 B2 | 6/2005 |
| WO | 2005-015149 A1 | 2/2005 |

OTHER PUBLICATIONS

Brooks A. Childers, et al., "Use of 3000 Bragg grating sensors distributed on four eight-meter optical fibers during static load tests of a composite structure", Proceedings SPIE's 8$^{th}$ International Symposium on Smart Structure and Materials, 2001, pp. 133-142, vol. 4332.

* cited by examiner

PHYSICAL QUANTITY MEASURING APPARATUS UTILIZING OPTICAL FREQUENCY DOMAIN REFLECTOMETRY, AND METHOD FOR SIMULTANEOUS MEASUREMENT OF TEMPERATURE AND STRAIN USING THE APPARATUS

This is a Continuation Application of International Patent Application No. PCT/JP2009/053899, filed on Mar. 2, 2009. Priority is claimed on Japanese Patent Application No. 2008-51343, filed Feb. 29, 2008, and Japanese Patent Application No. 2008-239368, filed Sep. 18, 2008, the contents of which are incorporated herein by reference.

TECHNICAL FIELD

The present invention relates to a physical quantity measuring apparatus utilizing optical frequency domain reflectometry (OFDR), and to a method for simultaneous measurement of temperature and strain using the physical quantity measuring apparatus. In the physical quantity measuring apparatus utilizing OFDR, one or a plurality of fiber Bragg grating (FBG) sensors are arranged on a (one) polarization-maintaining (PM) fiber, and the position of the FBG sensor and physical quantities such as strain or temperature of the FBG sensor are measured.

BACKGROUND ART

A sensor that measures physical quantities such as temperature and strain using an optical fiber have some advantages such as a long operating life, a lightweight, a thin diameter, and a flexibility, thereby enabling it be used in narrow spaces. In addition, this sensor has a characteristic of a strong resistance to electromagnetic noise due to insulation property of the optical fiber. It is therefore anticipated that this sensor will be used for structural health monitoring of large constructions such as bridges and buildings, and aerospace equipment such as passenger airplanes and manmade satellites.

Performance requirements of the sensor for applying the structural health monitoring in these structures include high spatial resolution, and having a multipoint (multiplexed) sensor (having a wide detection range), and a capability of real time measurement, and the like.

While various optical fiber sensor systems have already been proposed, an optical fiber sensor using an FBG sensor and OFDR analysis method is a most promising optical fiber sensor that fully satisfies the above performance requirements.

The optical fiber sensor system using the FBG sensor and the OFDR analysis method determines the position of the FBG sensor by using cyclic change in interference light intensity between Bragg reflected light from the FBG sensor and reflected light from a referential reflecting end. In addition, this optical fiber sensor system measures strain and temperature of a detection part based on an amount of change in the wavelength of the Bragg reflected light.

Hitherto disclosed examples of this optical fiber sensor system include one with high spatial resolution of 1 mm or less (e.g. see Non-Patent Literature 1), one in which eight hundred FBG sensors are multiplexed on an eight-meter optical fiber, and one can measure strain at more than three thousand points with a total of four optical fibers simultaneously (e.g. see Non-Patent Literature 2), and one can real time measurements (e.g. see Patent Literature 1). In addition, according to Non-Patent Literature 1, it is also possible to measure strain distribution along the long direction of the FBG sensors ("strain distribution" signifies that the amount of strain along the long direction of the FBG sensors is uneven). Patent Literature 3 also describes means for measuring of strain distribution.

A general problem of optical fiber sensor systems includes that, when there is change in a plurality of physical quantities such as temperature and strain, it is not possible to independently identify and measure amount of these changes. Consequently, for example, when using the optical fiber sensor system as a strain sensor, a separate temperature-compensating sensor must be used so that temperature change of a detection part is not treated as the change in strain.

To solve this problem, a method using FBG sensors consist of PM fibers has been proposed (e.g. see Patent Literature 2). In this method, PANDA type PM fiber is used for FBG sensor, and temperature and strain can be measured simultaneously by measuring the amount of change in the wavelength of Bragg reflected lights from two orthogonal polarization axes at the FBG sensor consists of this PANDA fiber.

That is, this method provides a strain sensor that does not require a temperature-compensating sensor.

Conceivably, if the technologies mentioned above are combined in an optical fiber sensor system using FBG sensors consist of PM fiber and OFDR analysis method; it will be possible to achieve high spatial resolution, multipoint measuring, real time measuring, and simultaneous measurement of temperature and strain.

[Patent Literature 1] Japanese Patent No. 3740500
[Patent Literature 2] Japanese Patent No. 3819119
[Patent Literature 3] Japanese Patent No. 4102291
[Non-Patent Literature 1] H. Murayama, H. Igawa, K. Kageyama, K. Ohta, I. Ohsawa, K. Uzawa, M. Kanai, T. Kasai and I. Yamaguchi, "Distributed Strain Measurement with High Spatial Resolution Using Fiber Bragg Gratings and Optical Frequency Domain Reflectometry" Proceedings OFS-18, ThE40 (2006)
[Non-Patent Literature 2] B. Childers, M. E. Froggatt, S. G. Allison, T. C. Moore, D. A. Hare, C. F. Batten and D. C. Jegley, "Use of 3000 Bragg grating strain sensors distributed on four eight-meter optical fibers during static load test of a composite structure." Proceedings SPIE's 8th International Symposium on Smart Structure and Materials, Vol. 4332, pp. 133-142 (2001)

DISCLOSURE OF THE INVENTION

Problems to be Solved by the Invention

However, an optical fiber sensor system using an FBG sensor consists of PM fiber and OFDR analysis method has not yet been proposed. It is because measuring light must be split (branched) in a well-controlled manner to the two orthogonal polarization axes, and must then be propagated to the FBG sensor and to a referential reflecting end, in order to obtain stable measurement of Bragg reflected lights from two orthogonal polarization axes in the FBG sensor. Usually, however, measuring light is emitted in a single polarization. Therefore, when the optical path to the FBG sensor and the referential reflecting end is formed from PM fiber, while one Bragg reflected light among the Bragg reflected lights from the two orthogonal polarization axes at the FBG sensor can be measured, but the other cannot. Consequently, Bragg reflected lights from the two orthogonal polarization axes cannot be measured in the manner described above.

As a method for splitting the single-polarization measuring light into two orthogonal polarization axes, there is a method of constituting at least part of the optical path to the FBG sensor and the referential reflecting end with a single-mode fiber. However, this method is problematic in that the measuring light emitted in a single-polarization cannot be split in a well-controlled manner to the two orthogonal polarization axes.

Furthermore, in an optical fiber sensor system using an FBG sensor consists of PM fiber and OFDR analysis method, the effective refractive indices of the two orthogonal polarization axes are different. Consequently, for the OFDR analysis, there is a problem that the measured positions of Bragg reflected lights from the two polarization axes are at different positions. This makes it difficult to identify the position of the FBG sensor with high spatial resolution.

In OFDR analysis, the position of the FBG sensor is identified based on the cycle of the interference signal between the Bragg reflected light from the FBG sensor and the reflected light from the referential reflecting end. The position of the FBG sensor (more accurately, the fiber length difference between the referential reflecting end and the FBG sensor) can be obtained by means of short-time Fourier transform (hereinafter 'STFT') analysis if it is set an appropriate effective refractive index of optical fiber. Here, in the FBG sensor consists of PM fiber, irrespective of the difference of the effective refractive indices between the two orthogonal polarization axes, since a constant effective refractive index is set, the result is that Bragg reflected lights from the two orthogonal polarization axes are at different positions.

The present invention has been made in consideration of the above circumstances, and aims to provide a physical quantity measuring apparatus utilizing OFDR and a method for simultaneous measurement of temperature and strain using the physical quantity measuring apparatus. In an optical fiber sensor system that uses OFDR analysis method to identify the position of one or a plurality of FBG sensors arranged in one PM fiber and measure physical quantities such as strain and temperature of the FBG sensor, the physical quantity measuring apparatus utilizing OFDR and the method of the present invention can measure temperature and strain simultaneously, and can measure physical quantities with high spatial resolution.

Means for Solving the Problems

The present invention employed the followings in order to achieve the above-mentioned aims to solve those problems.

(1) A physical quantity measuring apparatus utilizing optical frequency domain reflectometry of the invention includes a tunable laser that emits measuring light; a first polarization-maintaining fiber with one end thereof connected with the tunable laser; a polarization-maintaining coupler connected with another end of the first polarization-maintaining fiber; a second polarization-maintaining fiber with one end thereof connected with the polarization-maintaining coupler and another end thereof being a referential reflecting end; a third polarization-maintaining fiber with one end thereof connected with the polarization-maintaining coupler; a sensor consists of fiber Bragg gratings formed at a core of the third polarization-maintaining fiber; a fourth polarization-maintaining fiber with one end thereof connected with the polarization-maintaining coupler; a photodiode connected with the polarization-maintaining coupler via the fourth polarization-maintaining fiber, and detects Bragg reflected light from the sensor and reference light from the referential reflecting end; a controller that detects a modulation of an interference intensity between the Bragg reflected light and the reference light, based on an intensity change of multiplexed light of the Bragg reflected light and the reference light detected by the photodiode; an incidence part that inputs the measuring light to both two orthogonal polarization axes of the second polarization-maintaining fiber and two orthogonal polarization axes of the third polarization-maintaining fiber; and an optical path-length adjuster that is arranged on the third polarization-maintaining fiber, and keeps an optical path-length of the Bragg reflected light from the two orthogonal polarization axes at the sensor at a constant length, wherein the incidence part being provided on the first polarization-maintaining fiber, or on both the second polarization-maintaining fiber and third polarization-maintaining fiber.

(2) Preferably, the incidence part is a 45-degree polarization axis offset angle fusion splice part on the first polarization-maintaining fiber, while the incidence part is provided on the first polarization-maintaining fiber; whereas, the incidence part is a 45-degree polarization axis offset angle fusion splice part on each of the second polarization-maintaining fiber and the third polarization-maintaining fiber, while the incidence parts are provided on both the second polarization-maintaining fiber and the third polarization-maintaining fiber.

(3) Preferably, the optical path-length adjuster is a 90-degree polarization axis offset angle fusion splice part on the third polarization-maintaining fiber where the sensor is formed.

(4) Preferably, the optical path-length adjuster is provided midway in a fiber length from a position corresponding to a length of the second polarization-maintaining fiber to the sensor.

(5) Preferably, a plurality of the sensors are arranged on the third polarization-maintaining fiber.

(6) Preferably, the optical path-length adjusters are provided midway in the fiber length between adjacent sensors respectively.

(7) Preferably, among the first polarization-maintaining fiber to the fourth polarization-maintaining fiber, a difference of effective refractive index between two orthogonal polarization axes of at least the third polarization-maintaining fiber is $4.4 \times 10^{-4}$ or more.

(8) A method for simultaneous measurement of temperature and strain using the physical quantity measuring apparatus utilizing optical frequency domain reflectometry according to one of (1) to (7) includes measuring a wavelength of Bragg reflected lights from two orthogonal polarization axes at one or a plurality of sensors; calculating an amount of change in the wavelength of the Bragg reflected light at the sensor caused by temperature and strain, based on the measured wavelength of the Bragg reflected light; and simultaneously measuring temperature and strain at a location where the sensor is provided, based on the calculated amount of change.

(9) Preferably, the method further includes calculating temperature distribution and strain distribution along a long direction of a location where the sensor is provided on the third polarization-maintaining fiber.

EFFECTS OF THE INVENTION

According to the physical quantity measuring apparatus utilizing optical frequency domain reflectometry described in (1), since the measuring apparatus includes a FBG sensor arranged at the core of a polarization-maintaining fiber, and an incidence part for making measuring light incident to two orthogonal polarization axes of the polarization-maintaining fiber where the sensor is provided, the temperature and strain of the sensor can be measured simultaneously. Further, since the measuring apparatus includes the optical path-length adjuster for maintaining a constant (same) optical path-length of Bragg reflected light from the two orthogonal polarization axes of the sensor, the position of the sensor can be identified accurately, and physical quantities can be measured with high spatial resolution.

According to the method for simultaneous measurement of temperature and strain described in (8), which uses the physical quantity measuring apparatus utilizing optical frequency domain reflectometry described in any one of (1) to (7), strain and temperature from one FBG sensor can be measured simultaneously. Moreover, temperature distribution and strain distribution along the long direction of the FBG sensor can also be measured simultaneously.

Figure 1:
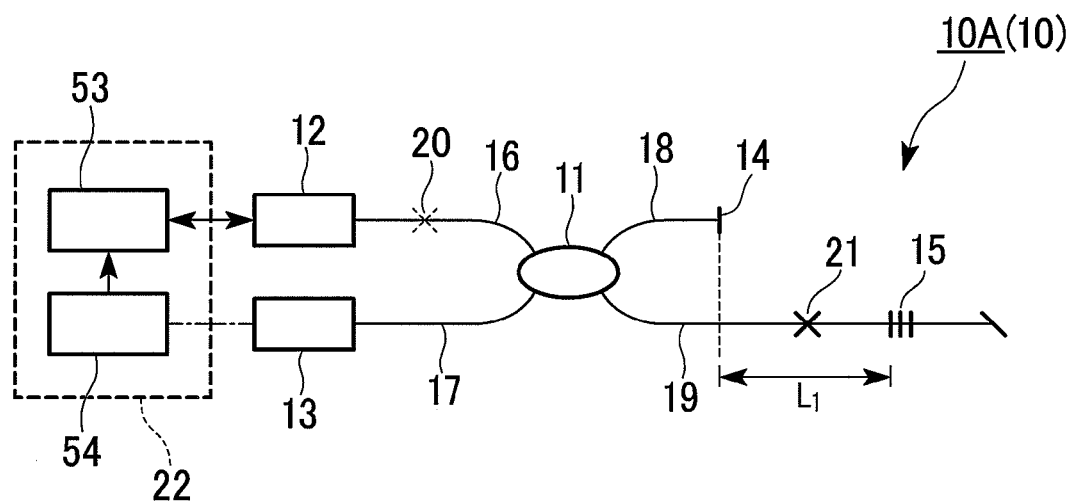
FIG. 1 is a schematic configuration view showing a first embodiment of a physical quantity measuring apparatus utilizing optical frequency domain reflectometry of the invention.

DESCRIPTION OF REFERENCE NUMERALS 10A, 10B, 10C, 10D, 10E, 10F (10) Physical quantity measuring apparatus utilizing optical frequency domain reflectometry
11, 31, 32 Polarization-maintaining coupler
12 Tunable laser
13, 35 Photodiode
14, 37, 38 Referential reflecting end
15, 15a, 15b Sensor
16, 17, 18, 19 Polarization-maintaining fiber
20 Incidence part
21, 21a, 21b Optical path-length adjuster
22 Controller
41, 42, 43, 44, 47, 48 PANDA fiber
53 System controller
54 A/D converter
60 (60A, 60B) PANDA fiber
61 (61A, 61B) Core
62 (62A, 62a, 62B, 62b) Stress-applying parts

BEST MODES FOR CARRYING OUT THE INVENTION

Embodiments of an optical fiber sensor system of the present invention will be explained with reference to the drawings.

First Embodiment

FIG. 1 is a schematic configuration view showing a first embodiment of a physical quantity measuring apparatus utilizing optical frequency domain reflectometry (hereinafter abbreviated as 'OFDR') of the invention.

A physical quantity measuring apparatus utilizing OFDR 10A (10) of this embodiment broadly includes a tunable laser 12 that emits measuring light; a first polarization-maintaining fiber 16 with one end thereof connected with the tunable laser 12; a polarization-maintaining coupler 11 connected with another end of the first polarization-maintaining fiber 16; a second polarization-maintaining fiber 18 with one end thereof connected with the polarization-maintaining coupler 11 and another end being a referential reflecting end 14; a third polarization-maintaining fiber 19 with one end thereof connected with the polarization-maintaining coupler 11; a sensor 15 consists of a fiber Bragg grating formed at the core of the third polarization-maintaining fiber 19; a fourth polarization-maintaining fiber 17 with one end thereof connected with the polarization-maintaining coupler 11; a photodiode 13 connected whit the polarization-maintaining coupler 11 via the fourth polarization-maintaining fiber 17, and detecting Bragg reflected light from the sensor 15 and reference light from the referential reflecting end 14; a controller 22 that detects a modulation of the interference light intensity between the Bragg reflected light and the reference light, based on the intensity change of multiplexed light of the Bragg reflected light and the reference light detected by the photodiode 13; an incidence part 20 that inputs the measuring light to both two orthogonal polarization axes of the second polarization-maintaining fiber 18 and two orthogonal polarization axes of the third polarization-maintaining fiber 19; and an optical path-length adjuster 21 that is arranged on the third polarization-maintaining fiber 19, and keeps the optical path-length of the Bragg reflected lights from the two orthogonal polarization axes at the sensor 15 at a constant (same) length. In this embodiment, the polarization-maintaining coupler 11 consists of the same type of polarization-maintaining (hereinafter 'PM') fiber as the first to the fourth PM fibers.

As the tunable laser 12, it is ideal to use a laser whose coherence length is longer than the optical path length from the point where the measuring light is emitted from the tunable laser 12 to the point where, after being reflected from the sensor 15, it is inputs to the photodiode 13.

As the photodiode 13, it is ideal to use one with a cutoff frequency that can detect intensity modulation of optical interference obtained from two reflection points, i.e. the referential reflecting end 14 and the sensor 15, when the wavelength of the measuring light emitted from the tunable laser 12 has been changed.

The controller 22, for example, includes an A/D converter 54 that samples a signal from the photodiode 13, and a system controller 53 that analyzes this sampling data. As the A/D converter 54, it is ideal to use one with a sampling frequency that can detect intensity modulation of optical interference detected by the photodiode 13. The A/D converter 54 digitally samples an analog optical interference signal measured by the photodiode 13. The digital interference signal is transmitted to the system controller 53. The system controller 53 uses the digital interference signal to perform short-time Fourier transform (hereinafter 'STFT') analysis. The analysis method is described later. There are no particular restrictions on the type of system controller 53, the sole requirement being that it can perform STFT analysis of the digital interference signal obtained at the A/D converter 54. The system controller 53 is connected with the tunable laser 12 via a universal interface bus (GPIB), and controls the tunable laser 12.

Figure 2:
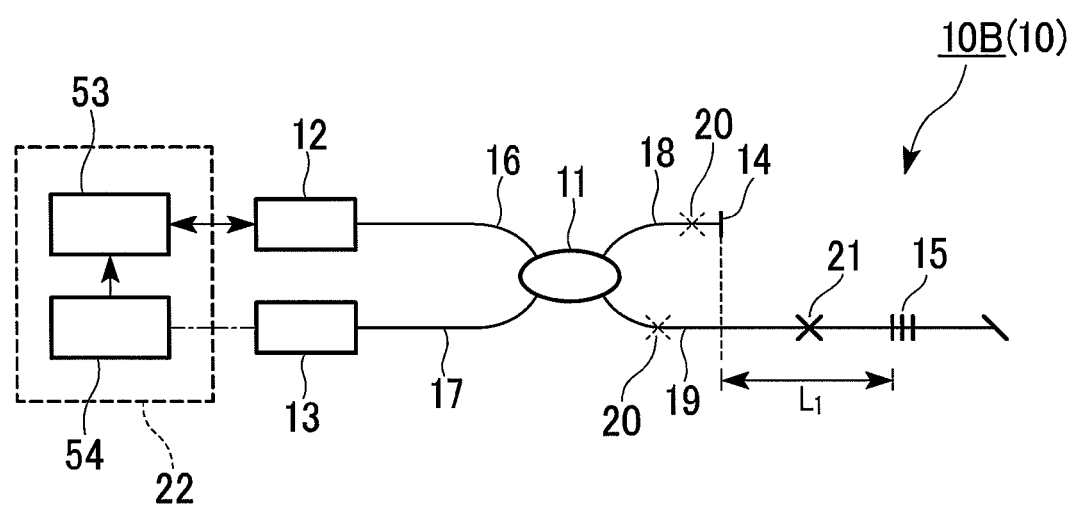
FIG. 2 is a schematic configuration view showing a modification of the same embodiment.

The incidence part 20 is arranged on the first PM fiber 16, and splits the measuring light emitted as a single polarization from the tunable laser 12 into two orthogonal polarization axes of the first PM fiber 16. The incidence part 20 need only be capable of making the measuring light incident to both the two orthogonal polarization axes of the second PM fiber 18 and the two orthogonal polarization axes of the third PM fiber 19, and, as shown in FIG. 2, can be provided on both the second PM fiber 18 and the third PM fiber 19. Since the incidence part 20 can acceptably be provided at a single location, it is preferably provided in the first stage of the split part between the third PM fiber 19 where the sensor 15 is formed and the second PM fiber 18 including the referential reflecting end 14 (i.e. the first PM fiber 16).

Any type of incidence part 20 can be used, provided that it can split single-polarization measuring light to two orthogonal polarization axes of the PM fiber, such as a method of inserting a half-wave ($\lambda/2$) plate, a method of providing a polarization angle offset fusion splice, or a method of arranging the PM fiber such that the polarization axis of the PM fiber has an angle offset with respect to single-polarization measuring light from the tunable laser 12, and joining light emitted from the tunable laser 12 to the PM fiber, etc.

Of these methods, for its simplicity and its ability to split the measuring light evenly into two polarized beams, the incidence part 20 is preferably a 45-degree polarization axis offset angle fusion splice (hereinafter '45-degree offset fusion splice') to the first PM fiber 16.

Here, a polarization axis angle offset fusion splice means fusion-splicing two PM fibers such that forming an offset angle of one polarization axes of one PM fiber with respect to that of the other PM fiber in a fusion splice point. An offset angle of one polarization axes of the PM fiber has formed in the fusion point signifies that a similar offset angle of the other polarization axis orthogonal thereto also has formed, and two PM fibers are fusion spliced to each other.

Figure 3:
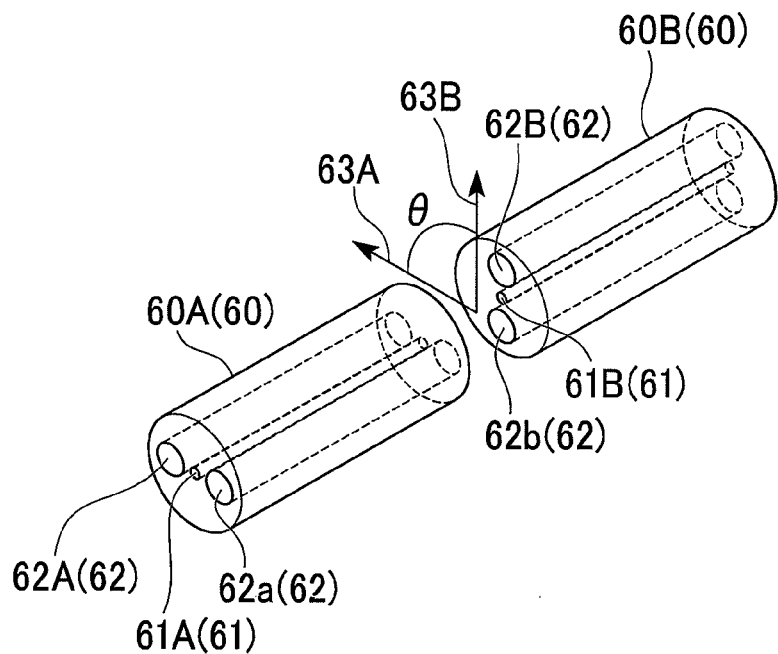
FIG. 3 is a schematic perspective view showing a polarization axis angle offset fusion splice while using a PANDA fiber.

FIG. 3 is a schematic view showing the state of a 45-degree offset fusion splice when a polarization-maintaining AND absorption-reducing (PANDA) fiber is used as the PM fiber.

A PANDA fiber 60 includes circular stress-applying parts 62 at the cladding at both ends of a core 61, in order to give the birefringence for the core. The stress-applying parts 62 generate a propagation constant difference (difference in effective refractive index) between the two orthogonal polarization modes. This enables coupling from each polarization mode to the other polarization mode to be suppressed. The polarization axes which these two orthogonal polarization modes propagate along are termed 'slow axis' and 'fast axis', and the difference in their effective refractive indices is termed 'birefringence'.

Straight lines that join the two stress-applying parts 62 to the core 61 (i.e. straight line 63A that joins the two stress-applying parts 62A and 62a of PANDA fiber 60A to the core 61A, and straight line 63B that joins the two stress-applying parts 62B and 62b of PANDA fiber 60B to the core 61B) are connected such as to obtain a desired polarization axis offset angle θ between the two PANDA fibers 60A and 60B, whereby the desired offset fusion splice can be achieved.

Any type of optical path-length adjuster 21 can be used, provided that it can adjust the optical path-length of Bragg reflected lights from the two orthogonal polarization axes at the sensor 15 to a constant length. For examples, it is includes a method of inserting a birefringent crystal into the optical path, a method of forming a fusion splice with a polarization axis angle offset to the PM fiber, and the like.

As the optical path-length adjuster 21, for reasons of simplicity and ease of adjusting the optical path-length, a 90-degree offset fusion is the most preferable of the above methods.

The optical path-length adjuster 21 is provided midway in the fiber length ($L_1$ in FIG. 1) from a position corresponding to the length of the second PM fiber 18 having the referential reflecting end 14 to the sensor 15, in order to achieve a constant optical path-length of the Bragg reflected lights from the two orthogonal polarization axes at the sensor 15. By arranging the optical path-length adjuster 21 at this position, the optical path-length of the Bragg reflected lights from the two orthogonal polarization axes at the sensor 15 can be made constant, and, when analyze the Bragg reflected lights from the two orthogonal polarization axes, those Bragg reflected lights can be made to reach the same measuring position.

In the physical quantity measuring apparatus utilizing OFDR 10A (10) of this embodiment, the incidence part 20 for splitting single polarization measuring light emitted from the tunable laser 12 to two orthogonal polarization axes of the second PM fiber 18 and the third PM fiber 19, are arranged between the tunable laser 12 and the PM coupler 11. This enables Bragg reflected lights from the two orthogonal polarization axes at the sensor 15 to be obtained. Based on the change in the wavelength of the Bragg reflected lights from this two orthogonal polarization axes, the strain and temperature at the location where the sensor 15 is placed can be measured simultaneously. As a result, a strain sensor that does not require separate temperature compensation can be achieved.

In the physical quantity measuring apparatus utilizing OFDR 10A, the optical path-length adjuster 21 is provided midway in the fiber length from a position corresponding to the length of the second PM fiber 18 having the referential reflecting end 14 to the sensor 15. This enables the optical path-length of the Bragg reflected lights from the two orthogonal polarization axes at the sensor 15 to be made constant. That is, when an interference signal between Bragg reflected light from the sensor 15 and reflected light from the referential reflecting end 14 is subjected to STFT analysis, the Bragg reflected lights from the two orthogonal polarization axes reach the same position.

Temperature and strain at the detection part can be measured simultaneously, by using the physical quantity measuring apparatus utilizing OFDR 10A to measure the amount of change in the wavelength of Bragg reflected lights from the two orthogonal polarization axes at the sensor 15, in which the change in wavelength is caused by the induced temperature and strain for the sensor.

(Method of Identifying Sensor Position)

Subsequently, a method of identifying the position of the sensor 15 using the physical quantity measuring apparatus utilizing OFDR 10A of this embodiment will be described. In this example, PANDA fibers are used as the first to the fourth PM fibers.

In the physical quantity measuring apparatus utilizing OFDR 10A of this embodiment, interference light between Bragg reflected light from the sensor 15 and reflected light from the referential reflecting end 14 is incident to the photodiode 13. This optical interference signal $D_1$ incident to the photodiode 13 is the summation of the signals of the two orthogonal polarization axes, expressed by the following equation (1).

$$D_1 = R_{slow} \cos\{k(n_{slow}+n_{fast})L_1\} + R_{fast} \cos\{k(n_{slow}+n_{fast})L_1\} \quad (1)$$

In the equation (1), $R_{slow}$ and $R_{fast}$ represent the intensity of interference light from two orthogonal polarization axes of the PANDA fiber, that is, they represent the interference light intensity from a slow axis (X-axis) and a fast axis (Y-axis). Also, k represents the wavenumber; $n_{slow}$ and $n_{fast}$ represent the effective refractive indices of the slow axis (X-axis) and the fast axis (Y-axis). $L_1$ represents the difference (fiber length difference) between the length on the second PANDA fiber (PM fiber) 18 from the PM coupler 11 to the referential reflecting end 14, and the length on the third PANDA fiber (PM fiber) 19 from the PM coupler 11 to the sensor 15. That is, as shown in FIG. 1, $L_1$ represents the fiber length from a position corresponding to the length of the second PM fiber 18 having the referential reflecting end 14 to the sensor 15 on the third PANDA fiber 19.

The abovementioned $D_1$ is determined using the physical quantity measuring apparatus utilizing OFDR 10A, and the obtained optical interference signal $D_1$ is subjected to STFT analysis in the system controller 53. The expression $(n_{slow}+n_{fast}) L_1$ in the first and second items on the right side of equation (1) signifies the length of the optical path along which the measuring light emitted from the tunable laser 12 propagates forward and back in fiber length difference $L_1$. That is, the optical path-length corresponding to $L_1$ in the third PANDA fiber becomes $\{(n_{slow}+n_{fast})/2\} L_1$, which corresponds to half of $(n_{slow}+n_{fast}) L_1$.

In the physical quantity measuring apparatus of the invention, an analog optical interference signal corresponding to equation (1) measured at the photodiode 13 is digitally sampled by the A/D converter 54 of the controller 22, and this digital interference signal is subjected to STFT analysis in the system controller 53 of the controller 22; in the present text, even when the description is abbreviated as 'the optical interference signal measured by the photodiode 13 is subjected to STFT analysis in the system controller 53', it is to be understood that the same process is being performed. Since, as already mentioned above, the A/D converter 54 has a sampling frequency that can detect intensity modulation of the optical interference detected by the photodiode 13, the analog optical interference signal and the sampled digital interference signal are essentially the same signal. Also, points that can more effectively explain the features of the invention, by using a formula that represents an analog optical interference signal, will be explained using an optical interference signal.

Subsequently in the physical quantity measuring apparatus utilizing OFDR 10A of this embodiment, known figures for $n_{slow}$ and $n_{fast}$ are substituted in the obtained optical path-length $\{(n_{slow}+n_{fast})/2\} L_1$, and $L_1$ is determined.

As $n_{slow}$ and $n_{fast}$ here, it is possible to use values determined from the wavelength of the Bragg reflected light from the sensor 15, and a grating period calculated from the interval between the diffracting gratings of the uniform period phase mask used in manufacturing the sensor 15, or values determined from near-field pattern measurements. The fact that the first and second items on the right side of equation (1) are constant here signifies that the Bragg reflected lights on the slow axis and the fast axis have the same optical path-length at fiber length difference $L_1$.

In this embodiment, Bragg reflected light from two orthogonal polarization axes at the sensor 15 is thus obtained. This enables temperature and strain to be measured simultaneously. Thus when using the physical quantity measuring apparatus utilizing OFDR 10A to measure strain, no sensor for temperature-compensation is needed. Furthermore, since Bragg reflected lights on the slow axis and the fast axis have the same optical path-length at fiber length difference $L_1$, the position of the sensor 15 can be identified accurately, whereby strain can be measured with high spatial resolution.

(Method for Measurement of Temperature and Strain)

Subsequently, a method for measurement of temperature and strain using the physical quantity measuring apparatus utilizing OFDR 10A of this embodiment will be described. This measuring method calculates temperature and strain from the shift amount in the wavelength of Bragg reflected lights from two orthogonal polarization axes at the sensor 15.

Firstly, the wavelength of Bragg reflected light from two orthogonal polarization axes of the sensor 15 at a predetermined reference temperature (e.g. 20° C.) and at a reference strain (e.g. 0 με) is measured.

The sensor 15 is then arranged at a location where detection is deemed desirable (hereinafter 'detection part'), and at this detection part, the wavelength of Bragg reflected light from two orthogonal polarization axes of the sensor 15 is measured.

The wavelength difference (amount of change) between the wavelength of Bragg reflected light in the detection part, and the wavelength of Bragg reflected light at the reference temperature and reference strain is calculated.

The obtained wavelength difference is inserted into equation (2) below to obtain the temperature difference between temperature at the detection part and the reference temperature, and the strain difference between strain at the detection part and the reference strain; lastly, the actual temperature and actual strain at the detection part are calculated from the known reference temperature and reference strain.

$$\begin{bmatrix} \Delta T \\ \Delta \varepsilon \end{bmatrix} = \frac{1}{D} \begin{bmatrix} \frac{\partial \lambda_{fast}}{\partial \varepsilon}, & -\frac{\partial \lambda_{slow}}{\partial \varepsilon} \\ -\frac{\partial \lambda_{fast}}{\partial T}, & \frac{\partial \lambda_{slow}}{\partial T} \end{bmatrix} \begin{bmatrix} \Delta \lambda_{slow} \\ \Delta \lambda_{fast} \end{bmatrix} \quad (2)$$

BUT $$D = \frac{\partial \lambda_{fast}}{\partial \varepsilon} \cdot \frac{\partial \lambda_{slow}}{\partial T} - \frac{\partial \lambda_{fast}}{\partial T} \cdot \frac{\partial \lambda_{slow}}{\partial \varepsilon}$$

In equation (2), $\Delta T$ represents the temperature difference between the temperature at the detection part and the reference temperature, and $\Delta \varepsilon$ represents the strain difference between the strain at the detection part and the reference strain. $\Delta \lambda_{slow}$ and $\Delta \lambda_{fast}$ represent the difference between the wavelength of Bragg reflected light from two orthogonal polarization axes of the sensor 15 at the detection part and the wavelength of Bragg reflected light from two orthogonal polarization axes of the sensor 15 at the reference temperature and reference strain, respectively. $\partial \lambda_{slow}/\partial \varepsilon$ and $\partial \lambda_{fast}/\partial \varepsilon$ represent Bragg wavelength shift amounts per unit of strain of the slow axis and the fast axis. $\partial \lambda_{slow}/\partial T$ and $\partial \lambda_{fast}/\partial T$ represent Bragg wavelength shift amounts per unit of temperature of the slow axis and the fast axis.

The Bragg wavelength shift amounts per unit of strain or per unit of temperature are obtained by using the physical quantity measuring apparatus utilizing OFDR 10A, and applying strain to the sensor 15 at the reference temperature (20° C.), and measuring the strain dependence of Bragg wavelength change of the slow axis and the fast axis at the sensor 15, and applying a temperature change to the sensor 15 at the reference strain (0 µε), and measuring the temperature dependence of Bragg wavelength change of the slow axis and the fast axis at the sensor 15.

Subsequently, from these values of $\partial \lambda_{slow}/\partial \varepsilon$, $\partial \lambda_{fast}/\partial \varepsilon$, $\partial \lambda_{slow}/\partial T$ and $\partial \lambda_{fast}/\partial T$, the value of D in equation (2) is obtained. This D value, and the values of $\Delta \lambda_{slow}$ and $\Delta \lambda_{fast}$ obtained from measurements, are then inserted into equation (2), and an arithmetic operation is performed to obtain $\Delta T$ and $\Delta \varepsilon$. And by subtracting the reference temperature and the reference strain from these values, the temperature and strain at the detection part can be obtained.

These arithmetic operations can be performed easily using the system controller 53 of the physical quantity measuring apparatus utilizing OFDR 10A.

Second Embodiment

Figure 4:
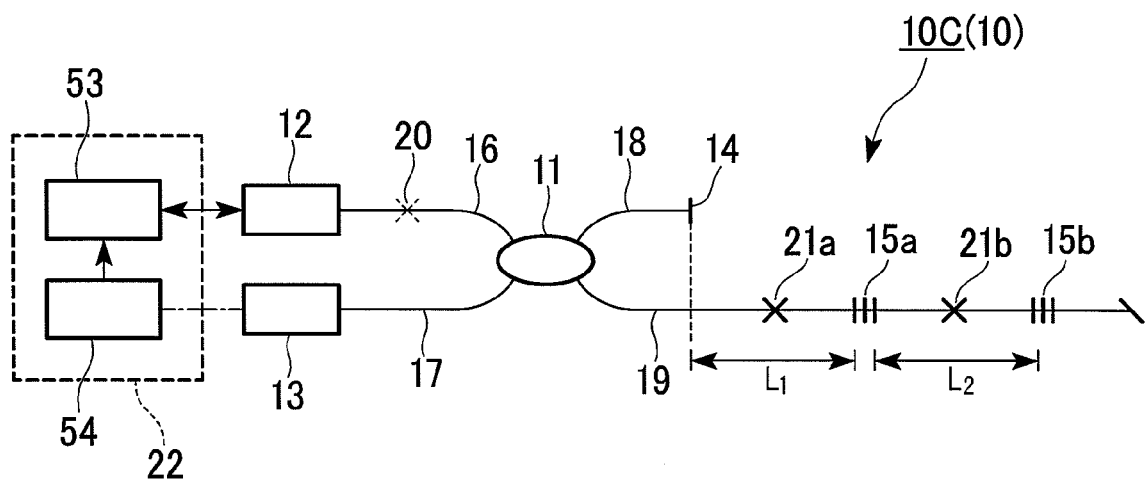
FIG. 4 is a schematic configuration view showing a second embodiment of a physical quantity measuring apparatus utilizing optical frequency domain reflectometry of the invention.

FIG. 4 is a schematic configuration view showing a second embodiment of the physical quantity measuring apparatus utilizing OFDR of the invention. A physical quantity measuring apparatus utilizing OFDR 10C (10) of this embodiment differs from the first embodiment in that a plurality of sensors 15 (in FIG. 4, two sensors 15a and 15b) are arranged on the third PM fiber 19.

The physical quantity measuring apparatus utilizing OFDR 10C of this embodiment further includes a second optical path-length adjuster 21b (21), provided midway in the fiber length between adjacent sensors (first sensor 15a and second sensor 15b). Therefore, optical path-lengths of Bragg reflected lights from two orthogonal polarization axes at the first sensor 15a and at the second sensor 15b can be made constant respectively. That is, when an interference signal between Bragg reflected lights from the first sensor 15a and the second sensor 15b, and reflected light from the referential reflecting end, is subjected to STFT analysis, Bragg reflected lights from these two orthogonal polarization axes are detected as the same position at each specific position of the first sensor 15a and the second sensor 15b. As a result, the position of each sensor 15a and 15b can be identified accurately.

When using the physical quantity measuring apparatus utilizing OFDR 10C of this embodiment, as in the abovementioned first embodiment, the positions of the sensors 15 can be identified, and temperature and strain can be measured. While in this embodiment, two sensors 15 (first sensor 15a and second sensor 15b) are provided on the third PM fiber 19, the physical quantity measuring apparatus utilizing OFDR of this embodiment is not limited to this arrangement. In the physical quantity measuring apparatus utilizing OFDR of this embodiment, three or more sensors 15 can be provided on the third PM fiber 19. In this case, as in this embodiment where two sensors 15 are provided, Bragg reflected lights from two orthogonal polarization axes can be detected at the same position for each sensor 15. That is, even when three or more sensors 15 are provided on the third PM fiber 19, the position of each sensor 15 can be accurately identified, and strain can be measured with high spatial resolution.

Third Embodiment

In the physical quantity measuring apparatus utilizing OFDR 10 according to the first and second embodiments described above, the third PM fiber 19 where the sensors 15 are arranged is preferably consists of a PM fiber with a large difference in the effective refractive indices of the two orthogonal polarization axes (birefringence).

This increases the difference in sensitivity to temperature and strain in the two orthogonal polarization axes, and enables temperature and strain to be simultaneously measured with high accuracy. More specifically, it is preferable that the difference in the effective refractive indices of the two orthogonal polarization axes is not less than $4.4 \times 10^{-4}$. By satisfying this value, as shown by the results of examples described below, the shift characteristics difference of Bragg wavelength to sensor temperature change can be made greater than $-5.0 \times 10^{-4}$ nm/° C. As a result, remarkably high accuracy measurements of temperature and strain can be obtained, such as temperature error of 2° C., and strain error of 30 µε.

EXAMPLES

While the invention will now be described more specifically by examples, but the invention is not limited to these examples.

Example 1

Figure 5:
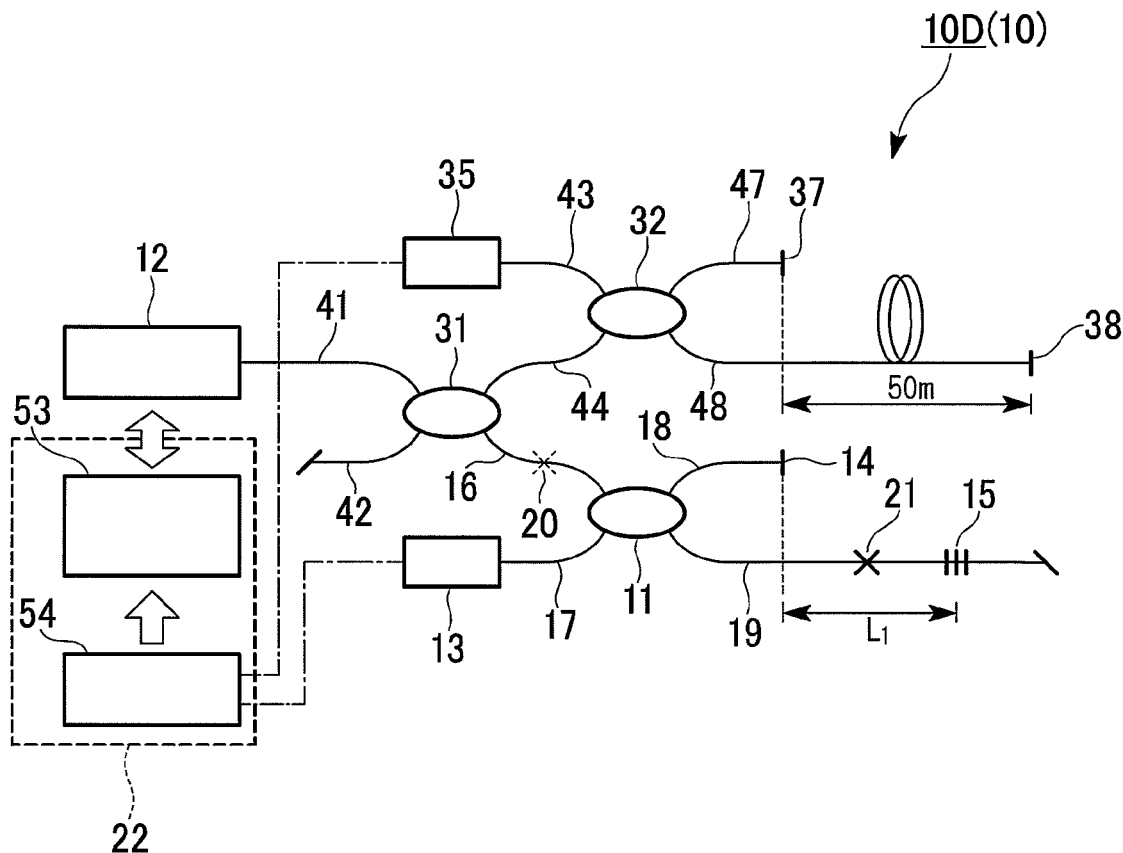
FIG. 5 is a schematic configuration view showing a physical quantity measuring apparatus utilizing optical frequency domain reflectometry of Example 1 of the invention.

FIG. 5 is a schematic view showing a physical quantity measuring apparatus utilizing OFDR 10D of Example 1. The configuration of this example is based on the physical quantity measuring apparatus utilizing OFDR 10A described in the first embodiment. In FIG. 5, constituent elements of the physical quantity measuring apparatus utilizing OFDR 10A of the first embodiment shown in FIG. 1 are designated by like reference numerals, and are not repetitiously explained.

The physical quantity measuring apparatus utilizing OFDR 10D of Example 1 further includes two PM couplers 31 and 32, a photodiode 35, and two referential reflecting ends 37 and 38 in the physical quantity measuring apparatus utilizing OFDR 10A shown in FIG. 1. These elements are connected together by PANDA type PM fibers 41, 42, 43, 44, 47, and 48. PANDA fibers are also used for first to fourth PM fibers and a PM coupler 11.

The tunable laser 12 connects with a system controller 53 via a general purpose interface bus (GPIB), thereby the controls are performed.

Signals from two photodiodes 13 and 35 are sampled by the A/D converter 54, and the sampling data is subjected to STFT analysis at the system controller 53. The analysis method is the same as the analysis method described in the first embodiment.

For the PM couplers 11, 31, and 32, PTAP-0150-2-B (model) made by Fujikura Ltd. was used.

For the tunable laser 12, 8164A (model) made by Agilent Ltd. was used.

For the photodiodes 13 and 35, 2117FC (model) made by New Focus Ltd. was used.

For the PANDA fibers 17, 18, 19, 20, 41, 42, 43, 44, 47, and 48, SM-15-PS-U25A (model) made by Fujikura Ltd. was used.

For the system controller 53, PXI-8106 (model) made by National Instruments Ltd. was used.

For the A/D converter 54, PXI-6115 (model) made by National Instruments Ltd. was used.

The tunable laser 12 emits single-polarization measuring light being swept (monotonously increased or monotonously decreased) within a constant wavelength range at a constant speed.

In Example 1, the tunable laser 12 emitted measuring light being swept over a wavelength range of 1545 to 1555 nm at a speed of 10 nm/s.

Single-polarization measuring light emitted from the tunable laser 12 propagates along the slow axis of PANDA fiber 41, and is incident to PM coupler 31. The PM coupler 31 splits the light, which is then incident to the two optical interferometers.

One of the two optical interferometers consists of the PM coupler 32, the referential reflecting ends 37 and 38, and the photodiode 35. This one of the optical interferometers generate trigger signals related to the fiber length difference (optical path-length difference) between PANDA fiber 47 including the referential reflecting end 37 and PANDA fiber 48 including the referential reflecting end 38. In Example 1, the fiber length difference between PANDA fiber 47 and PANDA fiber 48 was set to be 50 m.

The trigger signals are generated by the following method.

When measuring light being swept within a constant wavelength range at a constant speed from the tunable laser 12 is incident to the optical interferometer, the measuring light is reflected by the referential reflecting ends 37 and 38, and interference light thereof is measured by the photodiode 35. The A/D converter 54 samples a signal obtained by the photodiode 35, and converts it to a voltage signal. This voltage signal is acquired by the system controller 53. The wavelength of the measuring light emitted from the tunable laser 12 changes at a constant speed. Consequently, the signal measured by the photodiode 35 becomes a sine function that fluctuates at a constant optical wavenumber interval. Therefore, if a constant voltage value is used as a threshold, and the system controller 53 generates the trigger signals at a timing of crossing the threshold (a timing when the threshold is crossed from a value lower than the threshold, or a timing when it is crossed from a value above it), the generated trigger signals will have a constant optical wavenumber interval.

Even when the sweeping speed of the tunable laser 12 is not constant, this method of generating the trigger signals is remarkably effective in that the optical wavenumber interval is always constant.

The other one of the two optical interferometers has the schematic configuration of the first embodiment shown in FIG. 1.

The sensor 15 was made by a conventional exposure method using a KrF excimer laser and a uniform period phase mask. In Example 1, the grating length (sensor length) was 5 mm. The length $L_1$ from a position corresponding to the PANDA fiber 14 including the referential reflecting end 14 to the sensor 15 was approximately 20 m. Moreover, a 90-degree offset fusion splice was provided as an optical path-length adjuster 21 at a position midway in $L_1$, i.e. at a position approximately 10 m from a position corresponding to the length of the PANDA fiber 18 including the referential reflecting end 14. As an incidence part 20, a 45-degree offset fusion splice was provided at the PANDA fiber 16.

An obtained optical interference signal $D_1$ is subjected to STFT analysis by the system controller 53. The optical interference signal $D_1$ is expressed by the same equation (1) as the first embodiment. In this Example 1, the obtained optical interference signal $D_1$ was analyzed at a window width corresponding to approximately 40 ms intervals (the tunable laser 12 at a speed of 10 nm/s converts to a wavelength of approximately 400 pm intervals). When the sweeping speed of the tunable laser 12 is not constant, the analysis can be performed with a window width corresponding, not to a constant time interval, but to a constant optical wavenumber interval (i.e. a constant wavelength interval).

The state of the sensor 15 was measured using the physical quantity measuring apparatus utilizing OFDR 10D of this example. The results are shown in FIG. 6.

In the physical quantity measuring apparatus utilizing OFDR 10D, Bragg reflected light from the sensor 15 is displayed as a spectrogram. In this spectrogram, the horizontal axis represents wavelength, the vertical axis represents the position (fiber length from a position corresponding to the PANDA fiber 18 including the referential reflecting end 14), and color tone represents the Bragg reflection intensity.

Figure 6:
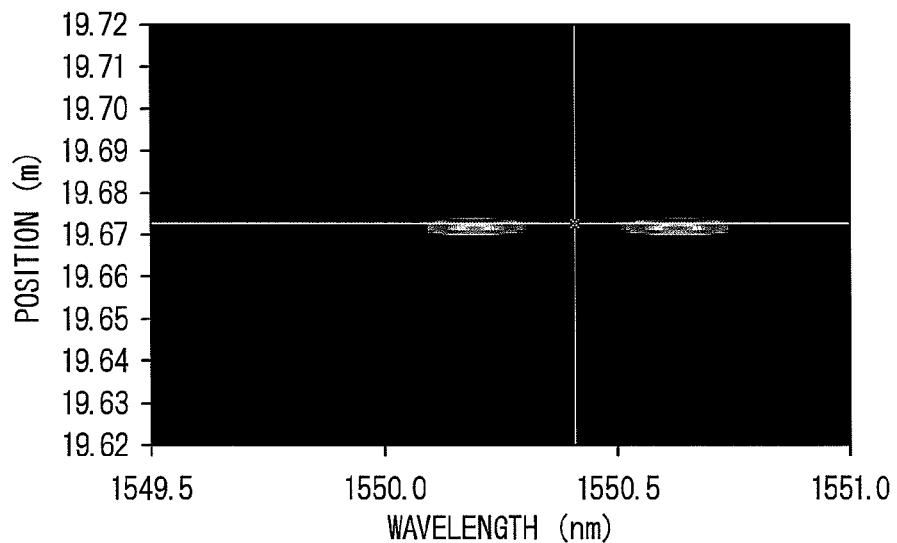
FIG. 6 is a spectrogram showing the measurement results of the status of sensor using Example 1.

In the spectrogram shown in FIG. 6, it can be assumed that 1550.6 nm Bragg reflected light is from the slow axis of the sensor 15, and 1550.2 nm Bragg reflected light is from the fast axis of the sensor 15, it is obtained the result that the position of each being almost the same, i.e. approximately 19.672 m.

In Example 1, it is confirmed that, since Bragg reflected light is obtained from two orthogonal polarization axes of the sensor 15, temperature and strain can be measured simultaneously. It is thus confirmed that, when using the physical quantity measuring apparatus utilizing OFDR 10D of this example to measure strain, no sensor for temperature-compensation is required. Also, since the position of the sensor 15 can be identified accurately, strain can be measured with high spatial resolution.

Subsequently, using the physical quantity measuring apparatus utilizing OFDR 10D of this example, strain was applied to the sensor 15 at the reference temperature (20° C.), and the strain dependence of Bragg wavelength change on the slow axis and the fast axis of the sensor 15 was measured. Further, using this example, temperature change was applied to the sensor 15 at the reference strain (0 με), and the temperature change dependence of Bragg wavelength change on the slow axis and the fast axis of the sensor 15 was measured. When each item in the abovementioned equation (2) at the sensor 15 was obtained, equation (3) below was obtained. By calculation using equation (3), the value of D in equation (2) was $D=-9.1515\times10^{-7}$ (nm²/με·° C.).

$$\frac{\partial \lambda_{fast}}{\partial \varepsilon} = 0.00125 \text{ nm}/\mu\varepsilon$$
$$\frac{\partial \lambda_{slow}}{\partial T} = 0.00973 \text{ nm}/° \text{ C.}$$
$$\frac{\partial \lambda_{fast}}{\partial T} = 0.01010 \text{ nm}/° \text{ C.}$$
$$\frac{\partial \lambda_{slow}}{\partial \varepsilon} = 0.00129 \text{ nm}/\mu\varepsilon$$
(3)

By inserting into equation (2) this D value, and the values for $\Delta\lambda_{slow}$ and $\Delta\lambda_{fast}$ obtained from the measurement results, and performing an arithmetic operation, $\Delta T$ and $\Delta\varepsilon$ are obtained. By subtracting the reference temperature and reference strain from these values, the temperature and strain at the detection part can be obtained.

Subsequently, Comparative Examples 1 and 2, which were performed to verify the effects of the invention, will be explained. These Comparative Examples 1 and 2 are not conventional technology; they are new technology implemented for the purpose of verifying the effects of the invention.

Comparative Example 1

As a Comparative Example 1, a physical quantity measuring apparatus utilizing OFDR was manufactured in the same manner as Example 1, excepting that the polarization axis offset angles at the fusion splice parts of the incidence part and the optical path-length adjuster were both set to be 0°. The state of the sensor was measured using the physical quantity measuring apparatus utilizing OFDR of the Comparative Example 1. The results are shown in FIG. 7.

Figure 7:
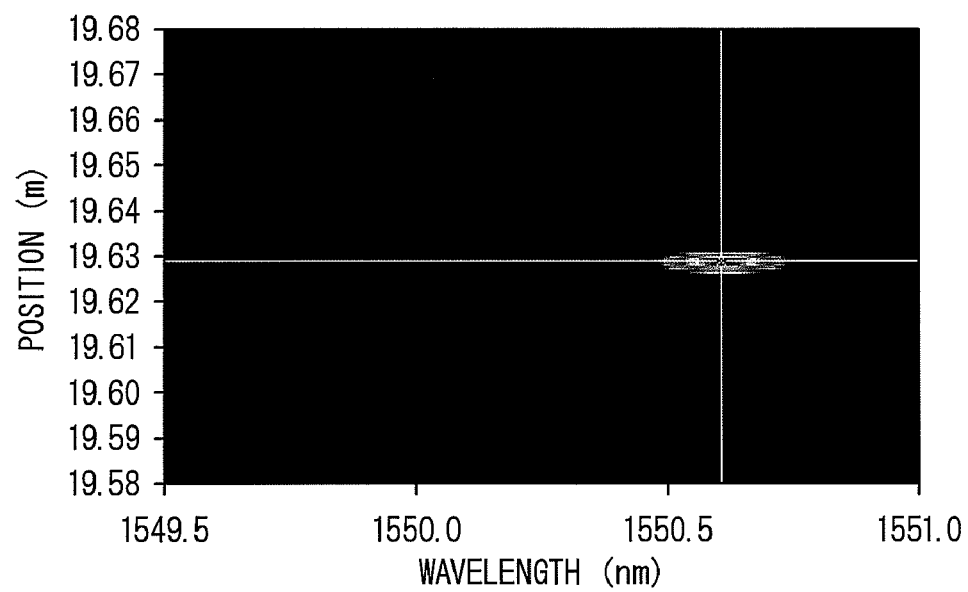
FIG. 7 is a spectrogram showing the measurement results of the state of sensor using a physical quantity measuring apparatus utilizing optical frequency domain reflectometry of Comparative Example 1.

As shown by the results in FIG. 7, in Comparative Example 1, Bragg reflected light was obtained only from the slow axis of the sensor 15. It is impossible to measure the temperature and strain of the sensor 15 simultaneously based on Bragg reflected light from only one polarization axis. Therefore, when using the physical quantity measuring apparatus utilizing OFDR of Comparative Example 1 to measure strain, a sensor for temperature-compensation is required.

Comparative Example 2

As a Comparative Example 2, a physical quantity measuring apparatus utilizing OFDR was manufactured in the same manner as Example 1, except that the polarization axis offset angle at the fusion splice part of the optical path-length adjuster was set to be 0°. The state of the sensor was measured using the physical quantity measuring apparatus utilizing OFDR of the Comparative Example 2. The results are shown in FIG. 8.

Figure 8:
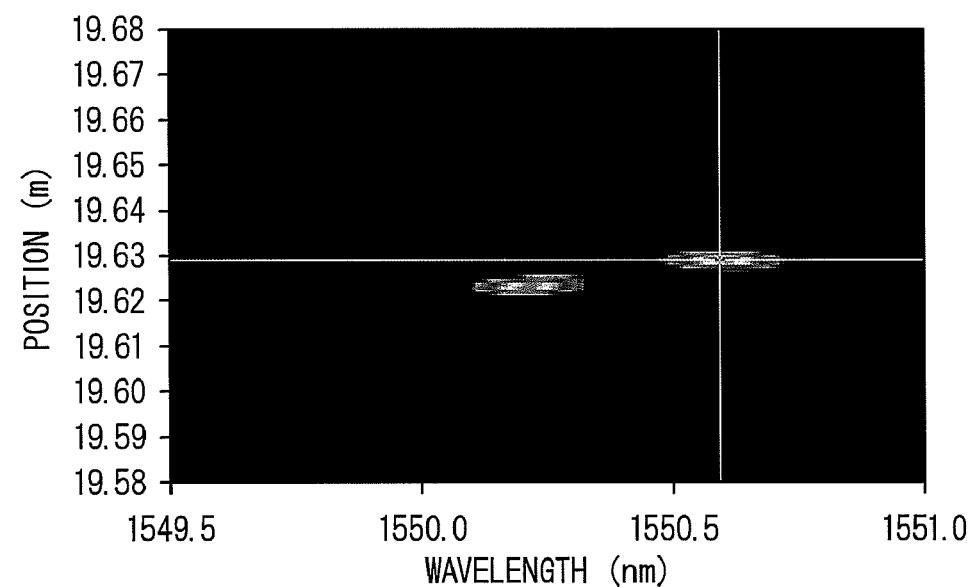
FIG. 8 is a spectrogram showing the measurement results of the state of sensor using a physical quantity measuring apparatus utilizing optical frequency domain reflectometry of Comparative Example 2.

As shown in FIG. 8, in Comparative Example 2, Bragg reflected light was obtained from the slow axis and from the fast axis of the sensor 15. Therefore, when using the physical quantity measuring apparatus utilizing OFDR of Comparative Example 2 to measure strain, as in Example 1, a sensor for temperature-compensation is not required. However, since the positions of each Bragg reflected lights were different, the position of the sensor 15 could not be accurately identified, with the result that strain could not be measured with high spatial resolution.

In Comparative Example 2, an optical interference signal $D_2$ obtained at the photodiode 13 is expressed by equation (4) below.

$$D_2 = R_{slow} \cos(k2n_{slow}L_1) + R_{fast} \cos(k2n_{fast}L_1) \quad (4)$$

A difference here from the optical interference signal $D_1$ obtained in the first embodiment and Example 1 is that, in the first and second items on the right side of the equation, the measuring light emitted from the tunable laser 12 has a different optical path-length forward and backward along the fiber length difference $L_1$. This is because $n_{slow}$ and $n_{fast}$ always maintain a relationship of $n_{slow} > n_{fast}$. When the optical path-lengths of the first and second items on the right side of equation (4) are different, this signifies that the Bragg reflected lights at the slow axis and the fast axis have different optical path-lengths with respect to the fiber length difference $L_1$. That is, as shown by the results in FIG. 8, the positions of these Bragg reflected lights are different.

The reason is that, even though separate effective refractive indices ($n_{slow}$ and $n_{fast}$) must be used for the signals of the two orthogonal polarization axes during STFT analysis, these signals are combined and being measured as optical interference signal $D_2$ by the photodiode 13, thereby this calculation have to be made using a constant effective refractive index (in Comparative Example 2, using $n_{slow}$).

In the spectrogram shown in FIG. 8, Bragg reflected light from the slow axis of the sensor 15 has a position of approximately 19.629 m, whereas Bragg reflected light from the fast axis of the sensor 15 has a position of approximately 19.624 m. The difference is thus approximately 5 mm.

This difference can be detected because an optical fiber sensor system that uses a sensor and OFDR analysis method has high spatial resolution of less than 1 mm. In other words, since other types of optical fiber sensor systems do not possess this level of spatial resolution (or do not include a unit for identifying position), they cannot detect such positional deviation. That is, this method is valid only for optical fiber sensor systems that use FBG sensors and OFDR analysis method.

Figure 9:
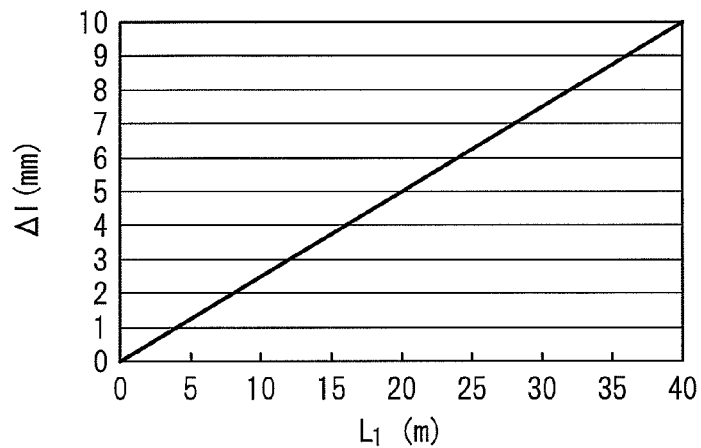
FIG. 9 is a graph showing calculation results of amounts of positional deviation of Bragg reflected lights from a slow axis and a fast axis of the sensor in Comparative Example 2.

Subsequently, the amount of positional deviation $\Delta l$ of Bragg reflected lights from the slow and fast axes of the sensor 15 was calculated. The results are shown in FIG. 9, which was obtained from the following equation (5).

$$n_{slow}\Delta l = n_{slow}L_1 - n_{fast}L_1$$
$$\therefore \Delta l = \frac{(n_{slow} - n_{fast})L_1}{n_{slow}}$$
(5)

Here, the length of the sensor 15 is short enough with respect to $L_1$ so as to be negligible.

In equation (5), values such as those obtained from the wavelength of the Bragg reflected light from the sensor 15 and a grating period calculated from the interval between the diffracting gratings of the uniform period phase mask used in manufacturing the sensor 15, or values obtained from near field pattern measurements, are used for $n_{slow}$ and $n_{fast}$.

In Comparative Example 2, based on equation (6) below, values obtained from the wavelength of the Bragg reflected light from the sensor 15, and a grating period calculated from the interval between the diffracting gratings of the uniform period phase mask used in manufacturing the sensor 15, were used, i.e. $n_{slow}=1.44756$, and $n_{fast}=1.44720$.

$$\left.\begin{array}{l} n_{slow} = \dfrac{\lambda_{slow}}{2\Lambda} \\ n_{fast} = \dfrac{\lambda_{fast}}{2\Lambda} \end{array}\right\} \quad (6)$$

In equation (6), $\lambda_{slow}$ and $\lambda_{fast}$ represent the wavelengths of Bragg reflected lights from the two orthogonal polarization axes of the sensor 15. $\Lambda$ represents the grating period calculated from the interval between the diffracting gratings of the uniform period phase mask.

From the results of FIG. 9, when the fiber length difference $L_1$, i.e. the distance from a reference position to the sensor 15, is 20 meters, the amount of positional deviation of Bragg reflected lights between the slow axis and the fast axis of the sensor 15 is calculated as approximately 5 mm. This value is very close to the test results of Comparative Example 2.

This calculated result is conceivably clear confirmation that, when the spatial resolution of an optical fiber sensor system utilizing FBG sensors and OFDR analysis method is set to be 1 mm, if the distance from a reference position to the sensor 15 is 4 m or more, there is positional deviation of Bragg reflected lights between the slow axis and the fast axis of the sensor 15.

That is, the invention is remarkably effective when the distance from the reference position to the FBG sensor is 4 m or more.

Example 2

Figure 10:
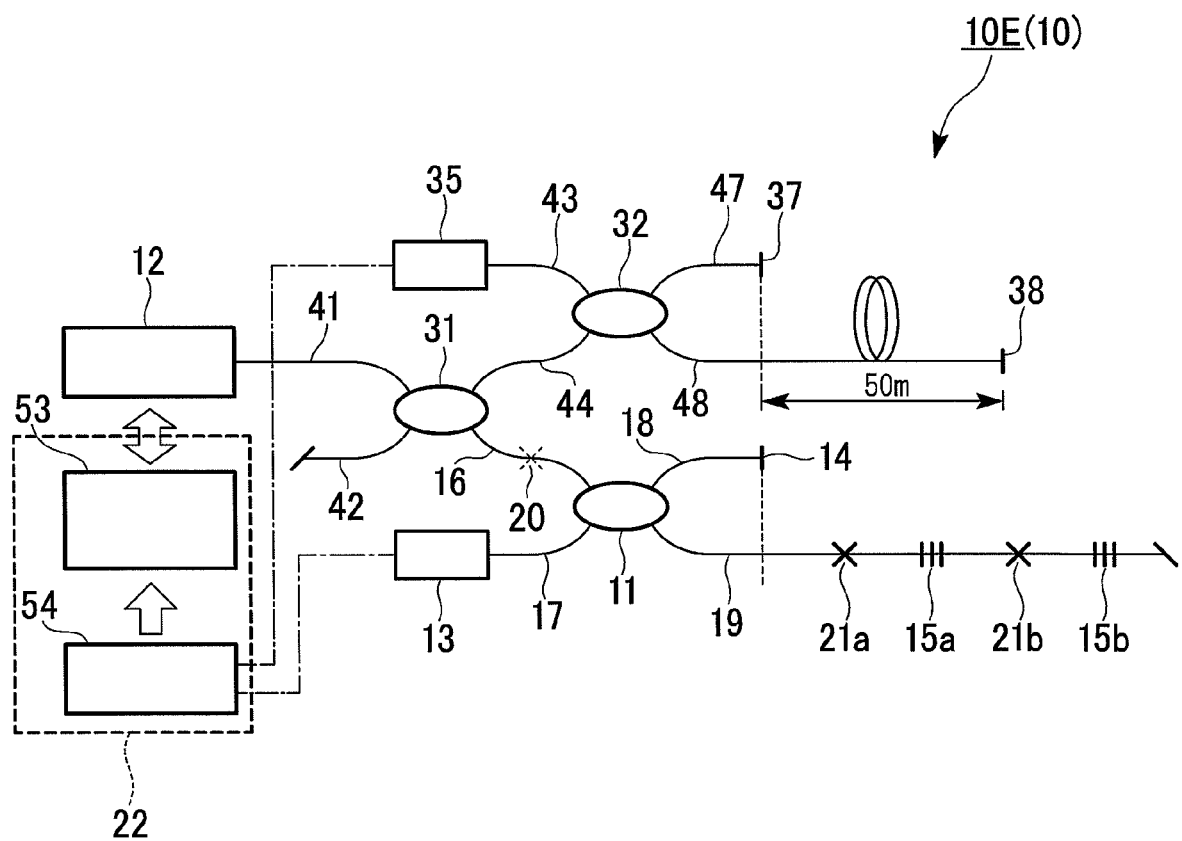
FIG. 10 is a schematic configuration view showing a physical quantity measuring apparatus utilizing optical frequency domain reflectometry of Example 2 of the invention.

FIG. 10 is a schematic configuration view showing a physical quantity measuring apparatus utilizing OFDR 10E of Example 2. Example 2 differs from Example 1 in that it was manufactured based on the physical quantity measuring apparatus utilizing OFDR 10C of the second embodiment. That is, this example differs from Example 1 in that a first sensor 15a and a second sensor 15b were provided on the third PM fiber (PANDA fiber) 19, and a second optical path-length adjuster 21b (90-degree offset fusion splice) was provided between the first sensor 15a and the second sensor 15b. The second sensor 15b was provided 5 m from the first sensor 15a. The second optical path-length adjuster 21b was provided approximately 2.5 m from the first sensor 15a and the second sensor 15b.

Figure 11:
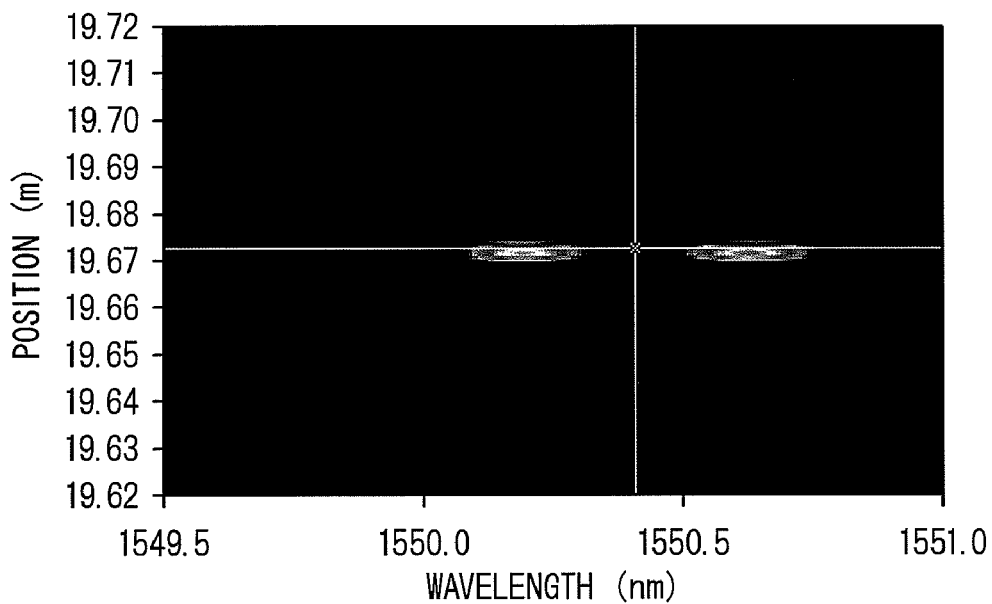
FIG. 11 is a spectrogram showing the measurement results of the state of sensor (first sensor) using Example 2.
Figure 12:
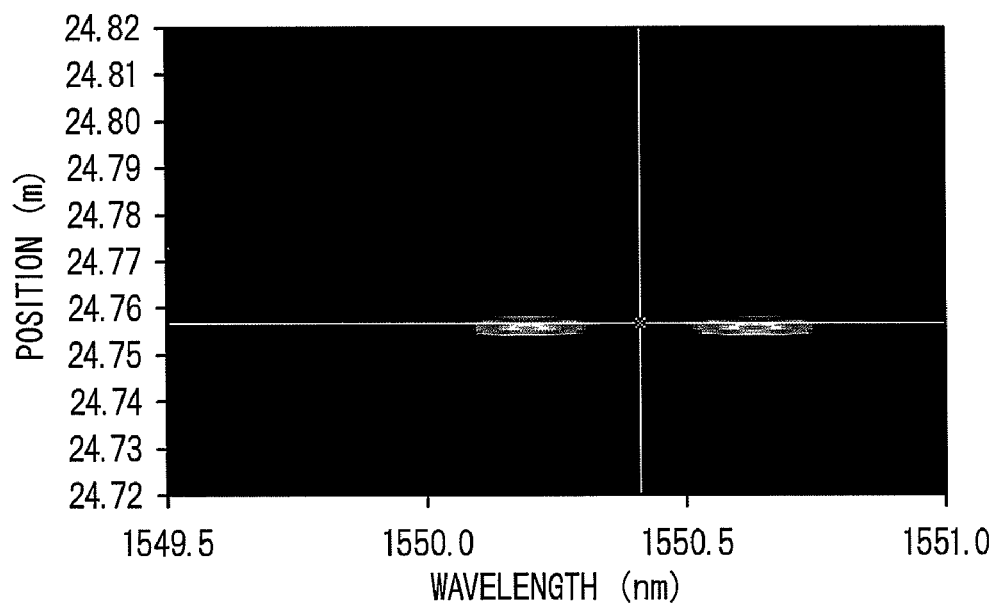
FIG. 12 is a spectrogram showing the measurement results of the state of sensor (second sensor) using Example 2.

FIG. 11 shows measurement results of the state of first sensor 15a, and FIG. 12 shows measurement results of the state of the second sensor 15b, taken using the physical quantity measuring apparatus utilizing OFDR 10E of this example.

From the results in FIG. 11 it was confirmed that the position of Bragg reflected light from the slow axis of the first sensor 15a, and the position of Bragg reflected light from the fast axis of the first sensor 15a, both match at approximately 19.672 m.

From the results in FIG. 12 it was confirmed that the position of Bragg reflected light from the slow axis of the second sensor 15b, and the position of Bragg reflected light from the fast axis of the second sensor 15b, both match at approximately 24.757 m.

These results confirmed that, even when there are a plurality of sensors, providing an optical path-length adjuster (90-degree offset fusion splice) between adjacent sensors enables Bragg reflected lights from two orthogonal polarization axes of each FBG sensor to be obtained at the same position.

Example 3

Example 3 was manufactured in the same manner as Example 1, excepting that the third PM fiber 19 where the sensor 15 is provided was consists of a PANDA fiber whose slow axis and fast axis have a large effective refractive index difference (birefringence).

This high birefringence PANDA fiber can be obtained, in terms of the configuration of FIG. 3, by arranging the stress-applying parts 62 near to the core 61. That is, the birefringence of the PANDA fiber can be adjusted arbitrarily depending on the arrangement of the stress-applying parts 62.

The state of the sensor 15 was measured using the physical quantity measuring apparatus utilizing OFDR of this example. The results are shown in FIG. 13.

Figure 13:
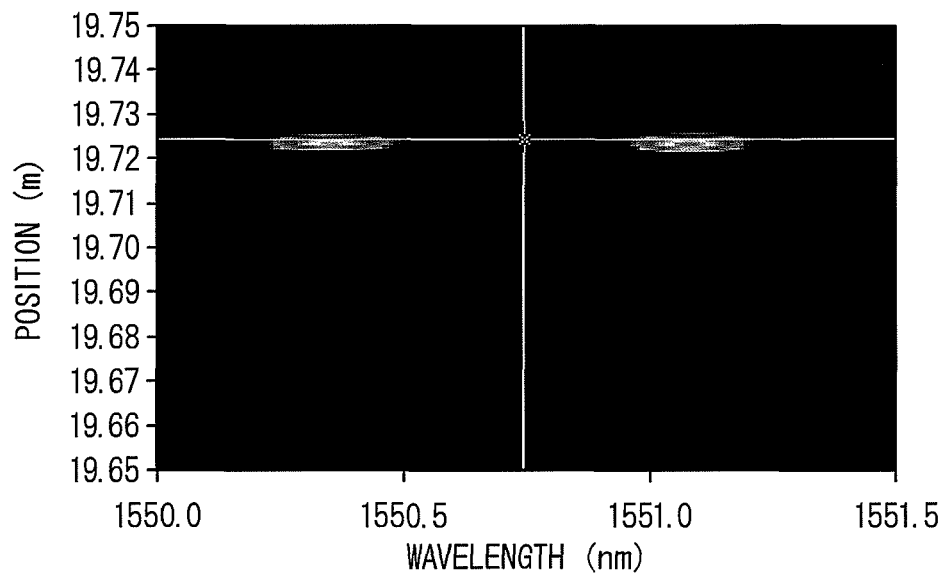
FIG. 13 is a spectrogram showing the measurement results of the state of sensor using a physical quantity measuring apparatus utilizing optical frequency domain reflectometry of Example 3 of the invention.

In the spectrogram shown in FIG. 13, 1551.1 nm Bragg reflected light is from the slow axis of the sensor 15, and 1550.4 nm Bragg reflected light is from the fast axis of the sensor 15.

When the spectrogram of the sensor 15 obtained in Example 3 was analyzed in greater detail, the Bragg wavelength difference between the slow axis and the fast axis was 0.670 nm. The birefringence calculated from this Bragg wavelength difference was $6.22 \times 10^{-4}$. The Bragg wavelength difference obtained by detailed analysis of the spectrogram of the sensor 15 obtained in Example 1 was 0.391 nm, and the birefringence calculated from this Bragg wavelength difference was $3.65 \times 10^{-4}$. That is, the birefringence of the PANDA fiber that forms the sensor 15 of Example 3 is twice the one that forms the sensor 15 of Example 1.

Subsequently, using this example, strain was applied to the sensor 15 at the reference temperature (20° C.), and the strain dependence of Bragg wavelength change on the slow axis and the fast axis of the sensor 15 was measured. Further, using this example, temperature change was applied to the sensor 15 at the reference strain (0 µε), and the temperature change dependence of Bragg wavelength change on the slow axis and the fast axis of the sensor 15 was measured; when each item in the abovementioned equation (2) was obtained at the sensor 15, equation (7) below was obtained. By performing a calculation using this equation, the value of D in equation (2) was $D = -10.908 \times 10^{-7}$ (nm$^2$/µε·° C.).

$$\left.\begin{array}{l} \dfrac{\partial \lambda_{fast}}{\partial \varepsilon} = 0.00126 \text{ nm/µε} \\ \dfrac{\partial \lambda_{slow}}{\partial T} = 0.01177 \text{ nm/° C.} \\ \dfrac{\partial \lambda_{fast}}{\partial T} = 0.01249 \text{ nm/° C.} \\ \dfrac{\partial \lambda_{slow}}{\partial \varepsilon} = 0.00128 \text{ nm/µε} \end{array}\right\} \quad (7)$$

When calculating temperature and strain using equation (2), the greater difference between $\partial \lambda_{slow}/\partial \varepsilon$ and $\partial \lambda_{fast}/\partial \varepsilon$, and the greater difference between $\partial \lambda_{slow}/\partial T$ and $\partial \lambda_{fast}/\partial T$ enable the calculation to obtain high accuracy result. In which, the difference between $\partial \lambda_{slow}/\partial \varepsilon$ and $\partial \lambda_{fast}/\partial \varepsilon$ represents the shift characteristics difference of Bragg wavelength with respect to strain of the slow axis and the fast axis, and the difference between $\partial \lambda_{slow}/\partial T$ and $\partial \lambda_{fast}/\partial T$ represents the shift characteristics difference of Bragg wavelength with respect to temperature change of the slow axis and the fast axis. It should be noted that the difference between $\partial \lambda_{slow}/\partial T$ and $\partial \lambda_{fast}/\partial T$ obtained in equation (7) of Example 3 is larger than that in equation (3) of Example 1.

Specifically, in equation (3) obtained in Example 1, the difference is $-3.7 \times 10^{-4}$ nm/° C., whereas in equation (7) obtained in Example 3, the difference is $-7.2 \times 10^{-4}$ nm/° C. That is, the sensor 15 of Example 3 has nearly twice the shift characteristics difference of Bragg wavelength with respect to temperature change compared to the sensor 15 of Example 1.

Conceivably, this is caused by a difference in birefringence of the PANDA fibers that constitute the sensors. It is known that the birefringence generated at the core of PANDA fiber decreases in proportion to the increase in temperature, and becomes almost zero at a temperature of 800 to 900° C., which is the fusion point of the stress-applying parts. That is, the greater the birefringence at the reference temperature, the greater the amount of decrease in birefringence per unit of temperature increase. Therefore, the sensor 15 of Example 3 has nearly twice the shift characteristics difference of Bragg wavelength with respect to temperature change compared to the sensor 15 of Example 1.

Subsequently, arbitrary temperature change and strain were applied to the sensor 15 of Example 3, and temperature change and strain were measured using the physical quantity measuring apparatus utilizing OFDR of Example 3. The results are shown in Table 1.

TABLE 1

| | | Set temperature change | | | | |
|---|---|---|---|---|---|---|
| | | 20° C. | | 40° C. | | 100° C. | |
| | | Measured value | error | Measured value | error | Measured value | error |
| Setting strain | 257 µε | 19.3° C. | −0.7° C. | 38.5° C. | −1.5° C. | 98.6° C. | −1.4° C. |
| | | 246 µε | −11 µε | 237 µε | −20 µε | 246 µε | −11 µε |
| | 535 µε | 19.2° C. | −0.8° C. | 38.6° C. | −1.4° C. | 98.9° C. | −1.1° C. |
| | | 515 µε | −20 µε | 508 µε | −27 µε | 519 µε | −16 µε |
| | 1056 µε | 18.9° C. | −1.1° C. | 38.3° C. | −1.7° C. | 98.4° C. | −1.6° C. |
| | | 1034 µε | −22 µε | 1029 µε | −27 µε | 1034 µε | −22 µε |

The temperature change was 20° C., 40° C., and 100° C. (i.e. the setting temperature was 40° C., 60° C., and 120° C.) from the reference temperature (20° C.), and, the strain change was 257 µε, 535 µε, and 1056 µε from the reference strain (0 µε), so that temperature and strain were measured under a total of nine conditions. As a result, temperature and strain were measured simultaneously with remarkably high accuracy, temperature error being less than 2° C., and strain error being less than 30 µε.

As described above, according to Example 3, an FBG sensor used in the physical quantity measuring apparatus utilizing OFDR of the invention is preferably consists of PANDA fibers having a large birefringence. After detailed consideration of simultaneous measurement accuracy of temperature and strain of a FBG sensor, it was understood that the shift characteristics difference of the Bragg wavelength with respect to temperature change of the sensor should preferably be greater than $-5.0 \times 10^{-4}$ nm/° C.

Figure 14:
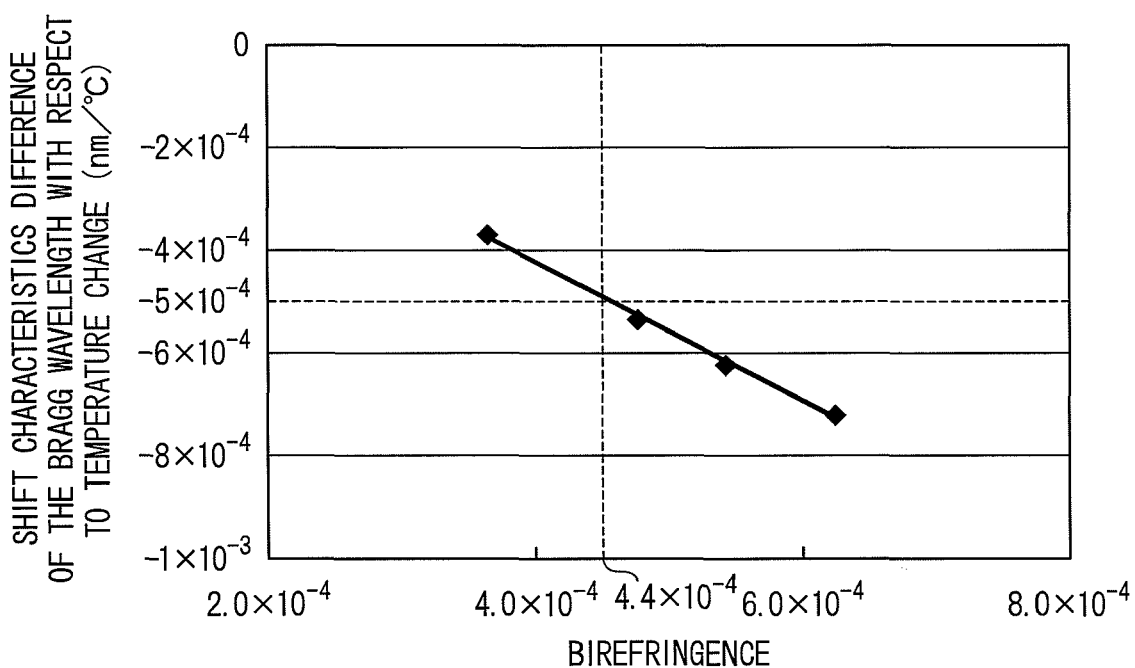
FIG. 14 is a graph showing the relationship between birefringence of a PANDA fiber, and shift characteristics difference of Bragg wavelength with respect to temperature change of an FBG sensor consists of PANDA fiber in Example 3.

FIG. 14 is a graph showing evaluation results of the birefringence of a PANDA fiber, and the shift characteristics difference of the Bragg wavelength with respect to temperature change of a FBG sensor consists of that fiber.

From the results of FIG. 14, when the birefringence of the PANDA fiber was $4.4 \times 10^{-4}$ or more, the shift characteristics difference of the Bragg wavelength with respect to temperature change of the sensor was greater than $-5.0 \times 10^{-4}$ nm/° C. That is, the birefringence of the PANDA fiber is preferably no less than $4.4 \times 10^{-4}$. There is a problem, however, that when the stress-applying parts are placed too near the core in order to increase the birefringence, the production yield of the PANDA fiber deteriorates. Therefore, the birefringence of the PANDA fiber is preferably no greater than $2.0 \times 10^{-3}$ so as to achieve good yield.

To ensure that the shift characteristics difference of the Bragg wavelength with respect to temperature change of the FBG sensor is greater than $-5.0 \times 10^{-4}$ nm/° C., this example used a PANDA fiber wherein stress-applying parts were placed near the core to increase birefringence. Another example of a PANDA fiber in which the invention can be implemented is one which has stress-applying parts with a low fusion point. More specifically, when the fusion point of the stress-applying parts is 600° C. or lower, the shift characteristics difference of the Bragg wavelength can be made greater than $-5.0 \times 10^{-4}$ nm/° C.

Example 4

Example 4 was made in the same manner as Example 3, except that the sensor length was 100 mm. The state of the sensor 15 was measured using a physical quantity measuring apparatus utilizing OFDR 10F of this example. The results are shown in FIG. 15.

Figure 15:
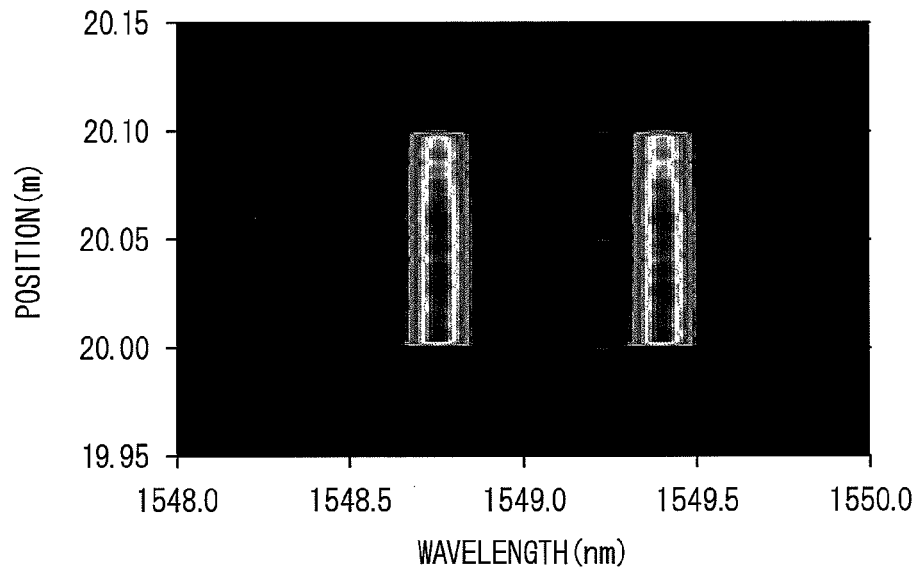
FIG. 15 is a spectrogram showing the measurement results of the state of sensor using a physical quantity measuring apparatus utilizing optical frequency domain reflectometry of Example 4 of the invention.

In the spectrogram of FIG. 15, Bragg reflected light of 1549.4 nm is from the slow axis of the sensor, and the one of 1548.7 nm is from the fast axis of the sensor.

The wavelength difference of Bragg reflected light obtained by more detailed analysis of this spectrogram was 0.670 nm. This wavelength difference is the same as that of the sensor with a length of 5 mm in Example 3. Therefore, a PANDA fiber using the sensor 15 of this example with a sensor length of 100 mm has a similar birefringence to that of the PANDA fiber using the sensor 15 of Example 3.

Figure 16:
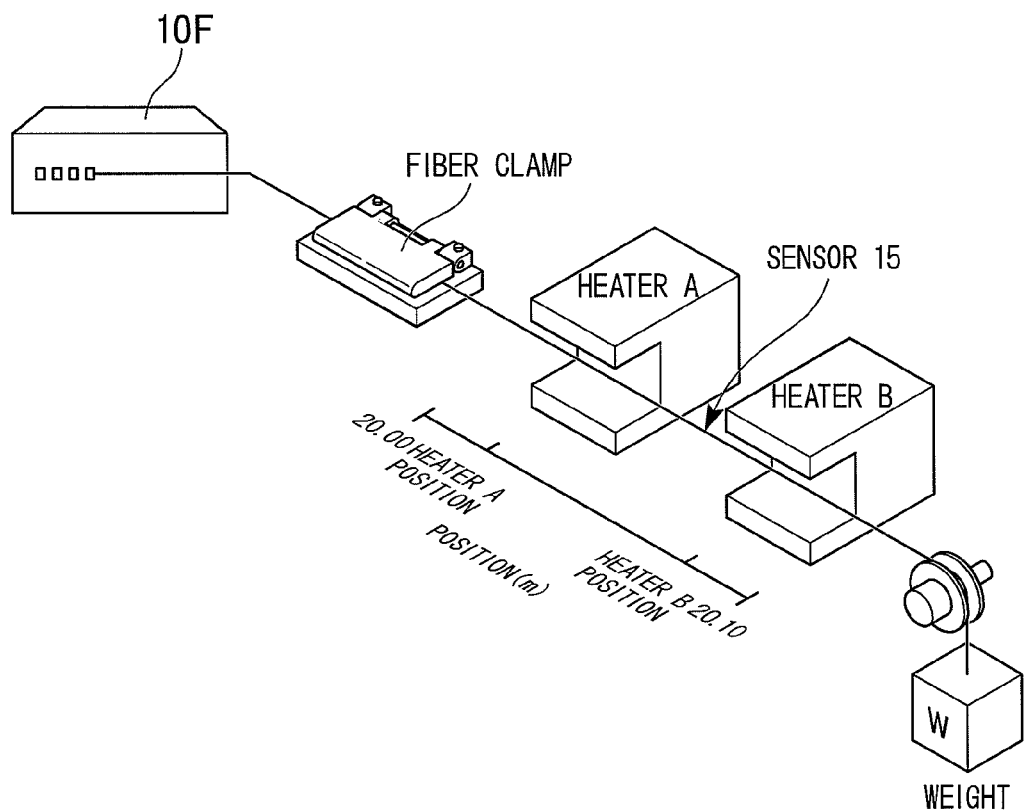
FIG. 16 is a schematic view showing a test system for measuring temperature distribution and strain generated in a sensor in Example 4.

FIG. 16 is a schematic view showing a test system for measuring temperature distribution and strain generated in a sensor, using a physical quantity measuring apparatus utilizing OFDR 10F of this example.

In this test system, a weight W applies a uniform strain along the long direction of the sensor 15. Also in this test system, a heater A and a heater B, whose temperatures can be controlled independently, apply non-uniform temperature change along the long direction of the sensor 15.

Figure 17:
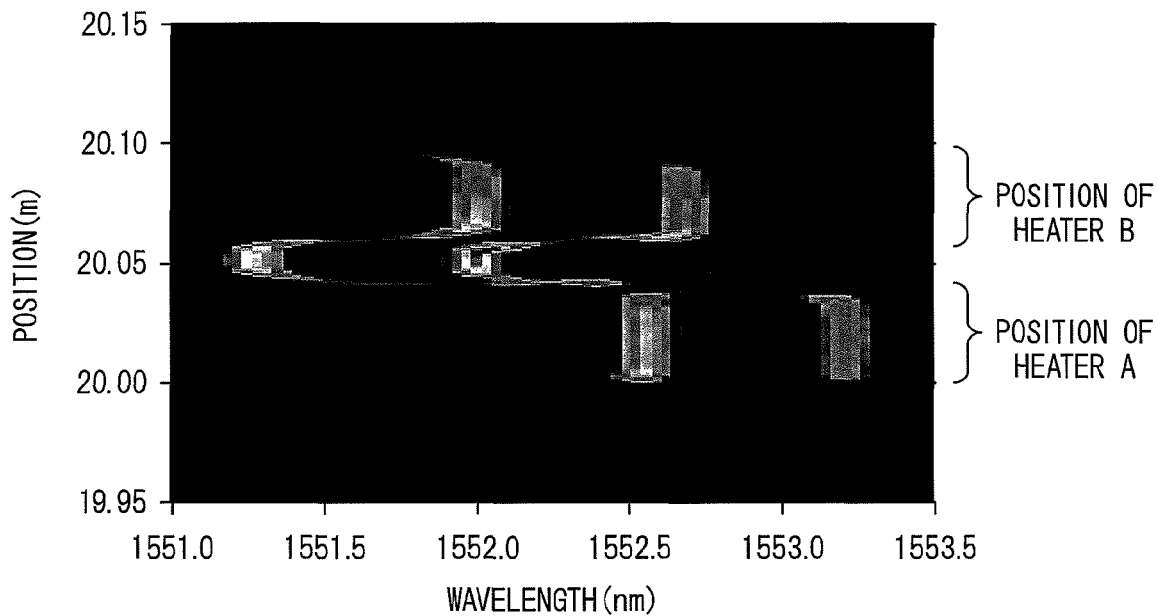
FIG. 17 is a spectrogram showing the measurement results of temperature change and strain at a position of heater A and a position of heater B in Example 4.

The state of the sensor 15 was measured by the test system shown in FIG. 16, using the physical quantity measuring apparatus utilizing OFDR 10F of this example. The results are shown in FIG. 17. At this case, the strain of 1000 µε is applied to the sensor 15 by the weight W, the temperature change of 100° C. is applied to the sensor 15 by heater A, and the one of 60° C. is applied to the sensor 15 by heater B.

As shown in FIG. 17, the region of the sensor heated by heater A had Bragg wavelength shift corresponding to the temperature change of 100° C., and strain of 1000 µε. The region of the sensor heated by heater B had Bragg wavelength shift corresponding to the temperature change of 60° C., and strain of 1000 µε. Whereas, the non-heated region between heater A and heater B had Bragg wavelength shift corresponding only to the strain of 1000 µε. In other words, in this example, by measuring the amount of change in the Bragg wavelength of the slow axis and the fast axis of the sensor 15 along the long direction of the sensor 15, the temperature distribution and strain along the long direction of the sensor 15 can be measured simultaneously.

Subsequently, in the test system shown in FIG. 16, the strain applied to the sensor 15 by the weight W was kept to be 1000 µε, and the temperature change applied to the sensor 15 by heater A was kept to be 100° C., while changing the temperature change applied to the sensor 15 by heater B to be from 0 to 100° C. The temperature change and strain at the positions of heater A and heater B were then measured. Results are shown in FIG. 18.

Figure 18:
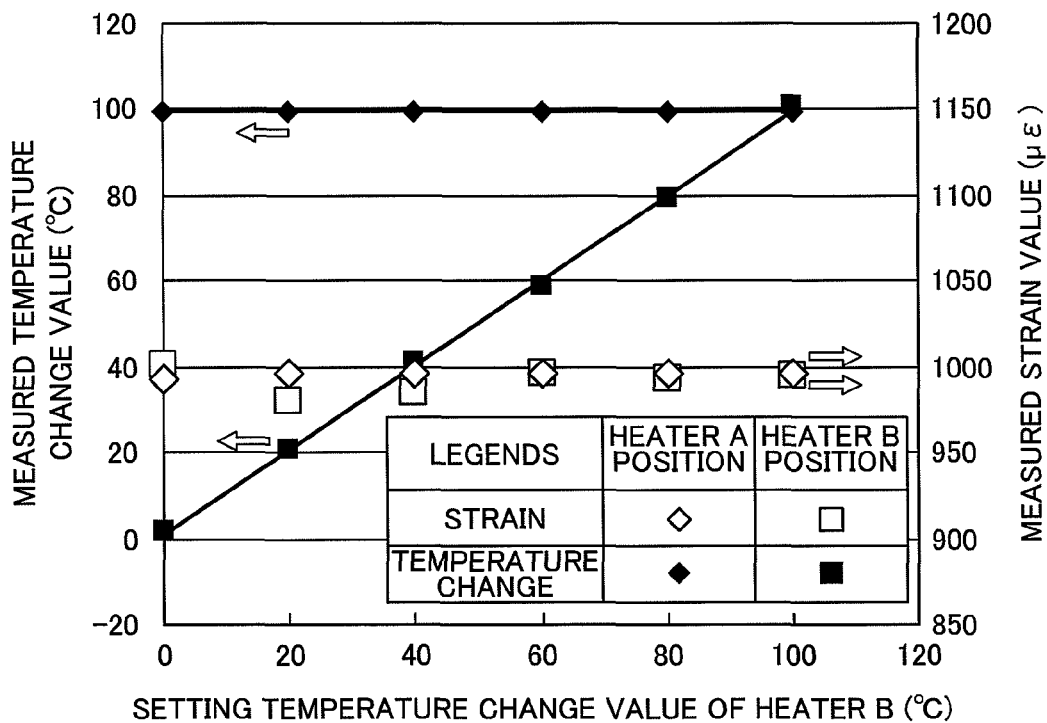
FIG. 18 is a graph showing the measurement results of temperature change and strain at a position of heater A and a position of heater B in Example 4.

As shown in FIG. 18, the strain measured at the position of heater A was constant at 1000 µε. Temperature change was also constant at 100° C. Whereas at the position of heater B, the strain measured was constant at 1000 µε, and the measured temperature change changed in correlation with the setting temperature of heater B. That is, it was possible to measure the temperature distribution and strain simultaneously at the position of heater A and the position of heater B with high accuracy.

As described above, according to this example, the invention can measure temperature distribution and strain simultaneously along the long direction of the FBG sensor with high accuracy. Also, by using the invention, even if temperature distribution and strain distribution are generated along the long direction of the FBG sensor, they can be measured simultaneously with high accuracy.

INDUSTRIAL APPLICABILITY

According to the physical quantity measuring apparatus utilizing OFDR of the invention, induced temperature and strain for a sensor can be measured simultaneously. Further, the position of the sensor can be identified accurately, and physical quantities can be measured with high spatial resolution. Moreover, temperature distribution and strain distribution along the long direction of the sensor can be measured simultaneously.

The invention claimed is:

1. A physical quantity measuring apparatus utilizing optical frequency domain reflectometry, comprising:
   a tunable laser that emits measuring light;
   a first polarization-maintaining fiber with one end thereof connected with the tunable laser;
   a polarization-maintaining coupler connected with another end of the first polarization-maintaining fiber;
   a second polarization-maintaining fiber with one end thereof connected with the polarization-maintaining coupler, and another end thereof being a referential reflecting end;
   a third polarization-maintaining fiber with one end thereof connected with the polarization-maintaining coupler;
   a sensor consists of fiber Bragg gratings formed at a core of the third polarization-maintaining fiber;
   a fourth polarization-maintaining fiber with one end thereof connected with the polarization-maintaining coupler;
   a photodiode connected with the polarization-maintaining coupler via the fourth polarization-maintaining fiber, and detects Bragg reflected light from the sensor and reference light from the referential reflecting end;
   a controller that detects a modulation of an interference intensity between the Bragg reflected light and the reference light, based on an intensity change of multiplexed light of the Bragg reflected light and the reference light detected by the photodiode;
   an incidence part that inputs the measuring light to both two orthogonal polarization axes of the second polarization-maintaining fiber and two orthogonal polarization axes of the third polarization-maintaining fiber; and
   an optical path-length adjuster that is arranged on the third polarization-maintaining fiber, and keeps the optical path-length of the Bragg reflected light from the two orthogonal polarization axes at the sensor at a constant length,
   wherein the incidence part being provided on the first polarization-maintaining fiber, or on both the second polarization-maintaining fiber and the third polarization-maintaining fiber.

2. The physical quantity measuring apparatus utilizing optical frequency domain reflectometry according to claim 1, wherein
   the incidence part is a 45-degree polarization axis offset angle fusion splice part on the first polarization-maintaining fiber, while the incidence part is provided on the first polarization-maintaining fiber;
   the incidence part is a 45-degree polarization axis offset angle fusion splice part on each of the second polarization-maintaining fiber and the third polarization-maintaining fiber, while the incidence part is provided on both the second polarization-maintaining fiber and the third polarization-maintaining fiber.

3. The physical quantity measuring apparatus utilizing optical frequency domain reflectometry according to claim 1, wherein the optical path-length adjuster is a 90-degree polarization axis offset angle fusion splice part on the third polarization-maintaining fiber where the sensor is formed.

4. The physical quantity measuring apparatus utilizing optical frequency domain reflectometry according to claim 2, wherein the optical path-length adjuster is a 90-degree polarization axis offset angle fusion splice part on the third polarization-maintaining fiber where the sensor is formed.

5. The physical quantity measuring apparatus utilizing optical frequency domain reflectometry according to claim 1, wherein the optical path-length adjuster is provided midway in a fiber length from a position corresponding to a length of the second polarization-maintaining fiber to the sensor.

6. The physical quantity measuring apparatus utilizing optical frequency domain reflectometry according to claim 2, wherein the optical path-length adjuster is provided midway in a fiber length from a position corresponding to a length of the second polarization-maintaining fiber to the sensor.

7. The physical quantity measuring apparatus utilizing optical frequency domain reflectometry according to claim 3, wherein the optical path-length adjuster is provided midway in a fiber length from a position corresponding to a length of the second polarization-maintaining fiber to the sensor.

8. The physical quantity measuring apparatus utilizing optical frequency domain reflectometry according to claim 4, wherein the optical path-length adjuster is provided midway in a fiber length from a position corresponding to a length of the second polarization-maintaining fiber to the sensor.

9. The physical quantity measuring apparatus utilizing optical frequency domain reflectometry according to claim 1, wherein a plurality of the sensors are arranged on the third polarization-maintaining fiber.

10. The physical quantity measuring apparatus utilizing optical frequency domain reflectometry according to claim 2, wherein a plurality of the sensors are arranged on the third polarization-maintaining fiber.

11. The physical quantity measuring apparatus utilizing optical frequency domain reflectometry according to claim 3, wherein a plurality of the sensors are arranged on the third polarization-maintaining fiber.

12. The physical quantity measuring apparatus utilizing optical frequency domain reflectometry according to claim 4, wherein a plurality of the sensors are arranged on the third polarization-maintaining fiber.

13. The physical quantity measuring apparatus utilizing optical frequency domain reflectometry according to one of claims 5, wherein a plurality of the sensors are arranged on the third polarization-maintaining fiber.

14. The physical quantity measuring apparatus utilizing optical frequency domain reflectometry according to claim 9, wherein the optical path-length adjusters are provided midway in the fiber length between adjacent sensors respectively.

15. The physical quantity measuring apparatus utilizing optical frequency domain reflectometry according to claim 1, wherein, among the first polarization-maintaining fiber to the fourth polarization-maintaining fiber, a difference of effective refractive index between the two orthogonal polarization axes of at least the third polarization-maintaining fiber is $4.4 \times 10^{-4}$ or more.

16. The physical quantity measuring apparatus utilizing optical frequency domain reflectometry according to claim 2, wherein, among the first polarization-maintaining fiber to the fourth polarization-maintaining fiber, a difference of effective refractive index between the two orthogonal polarization axes of at least the third polarization-maintaining fiber is $4.4 \times 10^{-4}$ or more.

17. The physical quantity measuring apparatus utilizing optical frequency domain reflectometry according to claim 3, wherein, among the first polarization-maintaining fiber to the fourth polarization-maintaining fiber, a difference of effective refractive index between the two orthogonal polarization axes of at least the third polarization-maintaining fiber is $4.4 \times 10^{-4}$ or more.

18. The physical quantity measuring apparatus utilizing optical frequency domain reflectometry according to claim 4, wherein, among the first polarization-maintaining fiber to the fourth polarization-maintaining fiber, a difference of effective refractive index between the two orthogonal polarization axes of at least the third polarization-maintaining fiber is $4.4 \times 10^{-4}$ or more.

19. A method for simultaneous measurement of temperature and strain using the physical quantity measuring apparatus utilizing optical frequency domain reflectometry according to one of claims 1, comprising:
    measuring a wavelength of Bragg reflected lights from two orthogonal polarization axes at one or a plurality of sensors;
    calculating an amount of change in the wavelength of the Bragg reflected light at the sensor caused by temperature and strain, based on the measured wavelength of the Bragg reflected lights; and
    simultaneously measuring the temperature and strain at a location where the sensor is provided, based on the calculated amount of change.

20. The method for simultaneous measurement of temperature and strain using the physical quantity measuring apparatus utilizing optical frequency domain reflectometry according to claim 19, further comprises calculating temperature distribution and strain distribution along a long direction of a location where the sensor is provided on the third polarization-maintaining fiber.

* * * * *